United States Patent
Minei et al.

(10) Patent No.: US 10,193,801 B2
(45) Date of Patent: Jan. 29, 2019

(54) AUTOMATIC TRAFFIC MAPPING FOR MULTI-PROTOCOL LABEL SWITCHING NETWORKS

(71) Applicant: Juniper Networks, Inc., Sunnyvale, CA (US)

(72) Inventors: Ina Minei, Mountain View, CA (US); Pedro R. Marques, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 97 days.

(21) Appl. No.: 14/152,137

(22) Filed: Jan. 10, 2014

(65) Prior Publication Data

US 2015/0146536 A1 May 28, 2015

Related U.S. Application Data

(60) Provisional application No. 61/908,662, filed on Nov. 25, 2013.

(51) Int. Cl.
  *H04L 12/723* (2013.01)
  *H04L 12/751* (2013.01)
(52) U.S. Cl.
  CPC ............ *H04L 45/507* (2013.01); *H04L 45/02* (2013.01)
(58) Field of Classification Search
  CPC .......................... H04L 47/125; H04L 45/507
  USPC ........................................................ 370/236
  See application file for complete search history.

(56) References Cited

U.S. PATENT DOCUMENTS

| | | |
|---|---|---|
| 6,055,561 A | 4/2000 | Feldman et al. |
| 6,266,704 B1 | 7/2001 | Reed et al. |
| 6,339,595 B1 | 1/2002 | Rekhter et al. |
| 6,507,914 B1 | 1/2003 | Cain et al. |
| 6,594,268 B1 | 7/2003 | Aukia et al. |
| 6,735,702 B1 | 5/2004 | Yavatkar et al. |
| 6,772,347 B1 | 8/2004 | Xie et al. |
| 6,775,280 B1 | 8/2004 | Ma et al. |
| 6,910,148 B1 | 6/2005 | Ho et al. |
| 7,080,161 B2 | 7/2006 | Leddy et al. |
| 7,120,931 B1 | 10/2006 | Cheriton |

(Continued)

OTHER PUBLICATIONS

IETF RFC 4760, Jan. 2007.*

(Continued)

*Primary Examiner* — Peter G Solinsky
(74) *Attorney, Agent, or Firm* — Shumaker & Sieffert, P.A.

(57) ABSTRACT

In general, techniques are described for automated traffic mapping for multi-protocol label switching (MPLS) networks. A network device comprising a processor and an interface card may perform the techniques. The processor may generate an advertisement that conforms to a routing protocol. The advertisement may advertise a mapping between a network flow and a label switched path (LSP) tag. The processor may also generate a communication associating the label switched path tag with an LSP. The interface card may transmit the advertisement to a head-end label edge router that admits traffic into the LSP identified by the LSP tag. The interface card may also transmit the communication to the label edge router such that the label edge router is able to process the communication in conjunction with the advertisement to map the network flow to the LSP identified by the LSP tag.

24 Claims, 6 Drawing Sheets

(56) References Cited

U.S. PATENT DOCUMENTS

| | | | |
|---|---|---|---|
| 7,136,374 | B1 | 11/2006 | Kompella |
| 7,139,242 | B2 | 11/2006 | Bays |
| 7,154,889 | B1 | 12/2006 | Rekhter et al. |
| 7,215,637 | B1 | 5/2007 | Ferguson et al. |
| 7,298,693 | B1* | 11/2007 | Owens ............... H04J 3/14 370/216 |
| 7,299,296 | B1 | 11/2007 | Lo et al. |
| 7,382,769 | B1 | 6/2008 | Rijsman |
| 7,421,487 | B1 | 9/2008 | Peterson et al. |
| 7,467,227 | B1 | 12/2008 | Nguyen et al. |
| 7,606,235 | B1* | 10/2009 | Ayyangar ............ H04L 45/00 370/395.21 |
| 7,769,873 | B1 | 8/2010 | Mackie |
| 7,773,596 | B1 | 8/2010 | Marques |
| 8,078,758 | B1* | 12/2011 | Callon ............... H04L 45/00 370/395.21 |
| 8,139,492 | B1* | 3/2012 | Peterson et al. ............ 370/238 |
| 8,281,400 | B1 | 10/2012 | Eater et al. |
| 8,339,959 | B1 | 12/2012 | Moisand et al. |
| 8,422,360 | B2 | 4/2013 | Shimizu et al. |
| 8,451,846 | B1* | 5/2013 | Ayyangar ............ H04L 45/50 370/395.5 |
| 8,483,123 | B2 | 7/2013 | Zheng et al. |
| 8,606,847 | B2 | 12/2013 | Raghunath et al. |
| 8,688,775 | B2 | 4/2014 | Penno et al. |
| 8,700,801 | B2 | 4/2014 | Medved et al. |
| 8,787,400 | B1* | 7/2014 | Barth ............... H04L 45/24 370/419 |
| 8,885,463 | B1* | 11/2014 | Medved et al. ............ 370/228 |
| 8,953,590 | B1* | 2/2015 | Aggarwal et al. ............ 370/389 |
| 2002/0101819 | A1 | 8/2002 | Goldstone |
| 2002/0165981 | A1 | 11/2002 | Basturk et al. |
| 2002/0198687 | A1 | 12/2002 | Dewan et al. |
| 2003/0016672 | A1 | 1/2003 | Rosen et al. |
| 2003/0076248 | A1 | 4/2003 | Larson |
| 2003/0103510 | A1 | 6/2003 | Svanberg et al. |
| 2003/0118029 | A1 | 6/2003 | Maher, III et al. |
| 2003/0118036 | A1* | 6/2003 | Gibson ............... H04L 45/02 370/401 |
| 2003/0137971 | A1* | 7/2003 | Gibson ............... H04L 45/50 370/351 |
| 2003/0185217 | A1* | 10/2003 | Ganti ............... H04L 12/64 370/395.5 |
| 2003/0212900 | A1 | 11/2003 | Liu et al. |
| 2005/0169313 | A1 | 8/2005 | Okamura et al. |
| 2005/0175341 | A1 | 8/2005 | Ovadia |
| 2006/0092952 | A1* | 5/2006 | Boutros et al. ............ 370/400 |
| 2006/0153067 | A1* | 7/2006 | Vasseur ............ H04L 12/5695 370/217 |
| 2006/0200579 | A1* | 9/2006 | Vasseur ............ H04L 45/04 709/238 |
| 2007/0133406 | A1* | 6/2007 | Vasseur ............ H04L 45/02 370/230 |
| 2007/0165515 | A1 | 7/2007 | Vasseur |
| 2008/0037562 | A1 | 2/2008 | Saleh et al. |
| 2008/0137655 | A1* | 6/2008 | Kim ............... H04L 47/782 370/389 |
| 2009/0116483 | A1* | 5/2009 | Anumala ............ H04L 12/4641 370/392 |
| 2009/0122718 | A1 | 5/2009 | Klessig et al. |
| 2011/0044352 | A1 | 2/2011 | Chaitou et al. |
| 2011/0047262 | A1 | 2/2011 | Martin et al. |
| 2011/0078230 | A1 | 3/2011 | Sepulveda |
| 2011/0110226 | A1 | 5/2011 | Lu et al. |
| 2011/0110368 | A1 | 5/2011 | Matsumoto |
| 2011/0202651 | A1 | 8/2011 | Hilt et al. |
| 2011/0286452 | A1* | 11/2011 | Balus ............... H04L 12/4641 370/390 |
| 2012/0092986 | A1 | 4/2012 | Chen |
| 2012/0158938 | A1 | 6/2012 | Shimonishi et al. |
| 2013/0003728 | A1* | 1/2013 | Kwong ............ H04L 45/02 370/389 |
| 2013/0007266 | A1 | 1/2013 | Jocha et al. |
| 2013/0016605 | A1* | 1/2013 | Chen ............ 370/221 |
| 2013/0159548 | A1* | 6/2013 | Vasseur ............ H04L 45/125 709/239 |
| 2013/0308444 | A1* | 11/2013 | Sem-Jacobsen et al. ..... 370/230 |
| 2014/0204731 | A1* | 7/2014 | Ye ............ H04L 45/22 370/222 |
| 2015/0003283 | A1* | 1/2015 | Previdi ............ H04L 41/12 370/254 |
| 2015/0030026 | A1* | 1/2015 | Kumar ............ H04L 45/50 370/392 |
| 2015/0109907 | A1* | 4/2015 | Akiya ............ H04L 47/125 370/229 |
| 2015/0312055 | A1* | 10/2015 | Varga ............ H04L 12/4641 370/254 |
| 2015/0351138 | A1* | 12/2015 | Metsala ............ H04W 76/02 370/254 |

OTHER PUBLICATIONS

Alimi et al., "ALTO Protocol," draft-ietf-alto-protocol-06.txt, ALTO WG Internet-Draft, Oct. 25, 2010, 66 pp.

Ash et al., "Path Computation Element (PCE) Communication Protocol Generic Requirements," RFC 4657, Sep. 2006, 22 pp.

Bryant et al., "Pseudo Wire Emulation Edge-to-Edge (PWE3) Architecture," RFC 3985, Mar. 2005, 40 pp.

Bryskin et al., "Policy-Enabled Path Computation Framework", RFC 5394, Dec. 2008, 37 pp.

Chamania et al., "Lessons Learned From Implementing a Path Computation Element (PCE) Emulator," Optical Fiber Communication and Exposition, Mar. 6-10, 2011, 3 pp.

Crabbe et al., "PCEP Extensions for Stateful PCE," Network Working Group Internet Draft, draft-crabbe-pce-stateful-pce-00, Oct. 16, 2011, 40 pp.

Farrel et al., "A Path Computation Element (PCE)-Based Architecture," RFC 4655, Aug. 2006, 41 pp.

Gibson, "DRDoS Description and analysis of a potent, increasingly prevalent, and worrisome Internet attack," Gibson Research Corporation, Feb. 22, 2002, 23 pp. www.grc.com/dos/drdos.htm.

Lee et al., "Path Computation Element Communication Protocol (PCEP) Requirements and Protocol Extensions in Support of Global Concurrent Optimization," RFC 5557, Jul. 2009, 27 pp.

Mckeown et al., "OpenFlow: Enabling Innovation in Campus Networks," Whitepaper from Stanford University, Mar. 14, 2008, 6 pp.

Miyazawa et al., "Traffic Engineering Database Management Information Base in support of MPLS-TE/GMPLS," Internet Draft, draft-ietf-ccamp-gmpls-ted-mib-09.txt, Jul. 11, 2011, 33 pp.

Oki et al., "Framework for PCE-Based Inter-Layer MPLS and GMPLS Traffic Engineering," RFC 5623, Sep. 2009, 35 pp.

"OpenFlow Switch Specification," Version 1.1.0, OpenFlow Consortium, Feb. 28, 2011, found at http://www.openflow.org/documents/openflow-spec-v1.1.0.pdf, 56 pp.

Sahni et al., "Bandwidth Scheduling and Path Computation Algorithms for Connection-Oriented Networks," Sixth International Conference on Networking, Apr. 22-28, 2007, 16 pp.

Seedorf et al., "Application-Layer Traffic Optimization (ALTO) Problem Statement," RFC 5693, Oct. 2009, 15 pp.

Vasseur et al., "Path Computation Element (PCE) Communication Protocol (PCEP)," RFC 5440, Mar. 2009, 88 pp.

Lougheed et al., "A Border Gateway Protocol (BGP)," RFC 1105, Jun. 1990, 37 pp.

Marques et al., "Dissemination of flow specification rules," Network Working Group, Internet draft, draft-marques-idr-flow-spec-00.txt, Jun. 2003, 10 pp.

Alvarez et al., "PCE Path Profiles," Internet Engineering Task Force, Internet Draft, draft-alvarez-pce-path-profiles-00, Oct. 22, 2013, 9 pp.

Crabbe et al., "PCEP Extensions for Stateful PCE," Network Working Group, Internet-Draft, draft-crabbe-pce-stateful-pce-00, Sep. 10, 2011, 34 pp.

Crabbe et al., "PCEP Extensions for PCE-initiated LSP Setup in a Stateful PCE Model", Network Working Group, Internet-Draft, draft-crabbe-pce-pce-initiated-lsp-03, Oct. 10, 2013, 17 pp.

(56) References Cited

OTHER PUBLICATIONS

Crabbe et al., "PCEP Extensions for Stateful PCE," PCE Working Group, Internet-Draft, draft-ietf-pce-stateful-pce-07, Oct. 8, 2013, 47 pp.
Marques et al., "Dissemination of Flow Specification Rules", Network Working Group, RFC 5575, Aug. 2009, 23 pp.
Awduche et al., "RSVP-TE: Extensions to RSVP for LSP Tunnels," The Internet Society, Network Working Group, RFC 3209, Dec. 2001, 61 pp.
Crabbe et al., "PCEP Extensions for PCE-initiated LSP Setup in a Stateful PCE Model," Network Working Group, Internet-Draft, draft-crabbe-pce-pce-initiated-lsp-00, Oct. 9, 2012, 14 pp.
Crabbe et al., "PCEP Extensions for Stateful PCE," Network Working Group, Internet-Draft, draft-ietf-pce-stateful-pce-02, Oct. 15, 2012, 49 pp.
U.S. Appl. No. 13/339,983, by Jan Medved, filed Dec. 29, 2011.
U.S. Appl. No. 13/340,191, by Jan Medved, filed Dec. 29, 2011.
U.S. Appl. No. 13/324,861, by Jan Medved, filed Dec. 13, 2011.
U.S. Appl. No. 10/080,865, by Ross Calion, filed Feb. 21, 2002.

\* cited by examiner

AUTOMATIC TRAFFIC MAPPING FOR MULTI-PROTOCOL LABEL SWITCHING NETWORKS

This application claims the benefit of U.S. Provisional Application No. 61/908,662, filed Nov. 25, 2013, the entire contents of which is incorporated herein by reference.

TECHNICAL FIELD

The techniques of this disclosure relate to computer networking and, more specifically, to mapping network traffic to paths established within a computer network.

BACKGROUND

Increasingly, routers are offloading the computationally intensive selection of paths to other network devices, referred to as path computation elements (PCEs). A PCE establishes PCE communication protocol (PCEP) sessions with one or more path computation clients (PCCs) through a network. Path computation clients, such as routers, and PCEs communicate over these PCEP sessions. A PCE may be stateless or stateful. In general, a stateless PCE does not maintain state describing TE LSPs in the network, while a stateful PCE maintains state for a subset of TE LSPs in the network. A stateful PCe may thereby utilize more sophisticated LSP path computation algorithms in some instances.

There may be two basic modes of operation for a PCE. The first mode of operation allows the PCCs to issue path computation requests to the PCE using their respective PCEP sessions. The PCE applies constraints provided in a path computation request to compute the path of a traffic engineering multi-protocol label switching (MPLS) label switched path (LSP) (which is often denoted as a "TE LSP") through a path computation domain that satisfies the constraints. The PCE then returns the path to the requesting PCC, effectively augmenting the network path computation functionality. A PCE may be stateless or stateful. In general, a stateless PCE does not maintain state describing TE LSPs in the network. A stateful PCE, on the other hand, maintains state for a subset of TE LSPs in the network, allowing the stateful PCE to utilize more sophisticated LSP path computation algorithms in some instances.

SUMMARY

In general, techniques are described in this disclosure that facilitate automated mapping of traffic to paths, such as traffic engineered multi-protocol label switching (MPLS) label switched paths (TE LSPs), within a computer network using a routing protocol that advertises routing information. In effect, the techniques may facilitate such mapping by decoupling TE LSP identification from the traffic mapping function. In other words, rather than map a forwarding equivalence class (FEC) identifying one or more traffic flows, the techniques may map the FEC to an LSP tag (which may also be referred to as an LSP color or LSP community in this disclosure) associated with a set of one or more TE LSPs. The techniques may provide for free association and dissociation of the LSP tag to the set of one or more TE LSPs. In this way, a path computation element (PCE) or other network device may "tag" TE LSPs at any time (meaning at creation of the LSP or after creation of the LSP) with an LSP tag, which is then mapped to a FEC by the routing protocol. The techniques may therefore enable the head-end label edge router (LER) that admits network flows into the set of one or more LSPs to identify these network flows mapped to the set of one or more TE LSPs and admit these network flows into the one or more TE LSPs (while, in some instances, providing different forms of load balancing across the one or more TE LSPs).

In one aspect, a method comprises generating, with a network device, an advertisement that conforms to a routing protocol used for advertising routing information, the advertisement advertising a mapping between a network flow and a label switched path tag, and generating, with the network device, a communication associating the label switched path tag with a label switched path. The method also comprises transmitting the advertisement in accordance with the routing protocol to a head-end label edge router that admits traffic into the label switched path identified by the label switch path tag, and transmitting the communication to the label edge router such that the label edge router is able to process the communication in conjunction with the advertisement to map the network flow to the label switched path identified by the label switched path tag.

In another aspect, a network device comprises one or more processors configured to generate an advertisement that conforms to a routing protocol used for advertising routing information, the advertisement advertising a mapping between a network flow and a label switched path tag, and generate a communication associating the label switched path tag with a label switched path, and an interface card configured to transmit the advertisement in accordance with the routing protocol to a head-end label edge router that admits traffic into the label switched path identified by the label switch path tag, and transmit the communication to the label edge router such that the label edge router is able to process the communication in conjunction with the advertisement to map the network flow to the label switched path identified by the label switched path tag.

In another aspect, a method comprises receiving, with a label edge router that admits network traffic to a label switched path, an advertisement from a network device, the advertisement conforming to a routing protocol and advertising a mapping between a network flow and a label switched path tag and receiving, with the label edge router, a communication associating the label switched path tag with the label switched path. The method further comprises processing, with the label edge router, the communication and the advertisement to map the network flow to the label switched path identified by the label switched path tag, and processing, with the label edge router, network traffic corresponding to the network flow to forward the packets via the label switched path identified by the label switched path tag.

In another aspect, a label edge router is configured to admit network traffic to a label switched path. The label edge router comprises an interface card configured to receive, with a label edge router that admits network traffic to a label switched path, an advertisement from a network device, the advertisement conforming to a routing protocol and advertising a mapping between a network flow and a label switched path tag, and receive a communication associating the label switched path tag with the label switched path. The label edge router also comprises a control unit configured to process the communication and the advertisement to map the network flow to the label switched path identified by the label switched path tag, and process network traffic corresponding to the network flow to forward the packets via the label switched path identified by the label switched path tag.

The details of one or more embodiments of the techniques are set forth in the accompanying drawings and the descrip-

DETAILED DESCRIPTION

Figure 1:
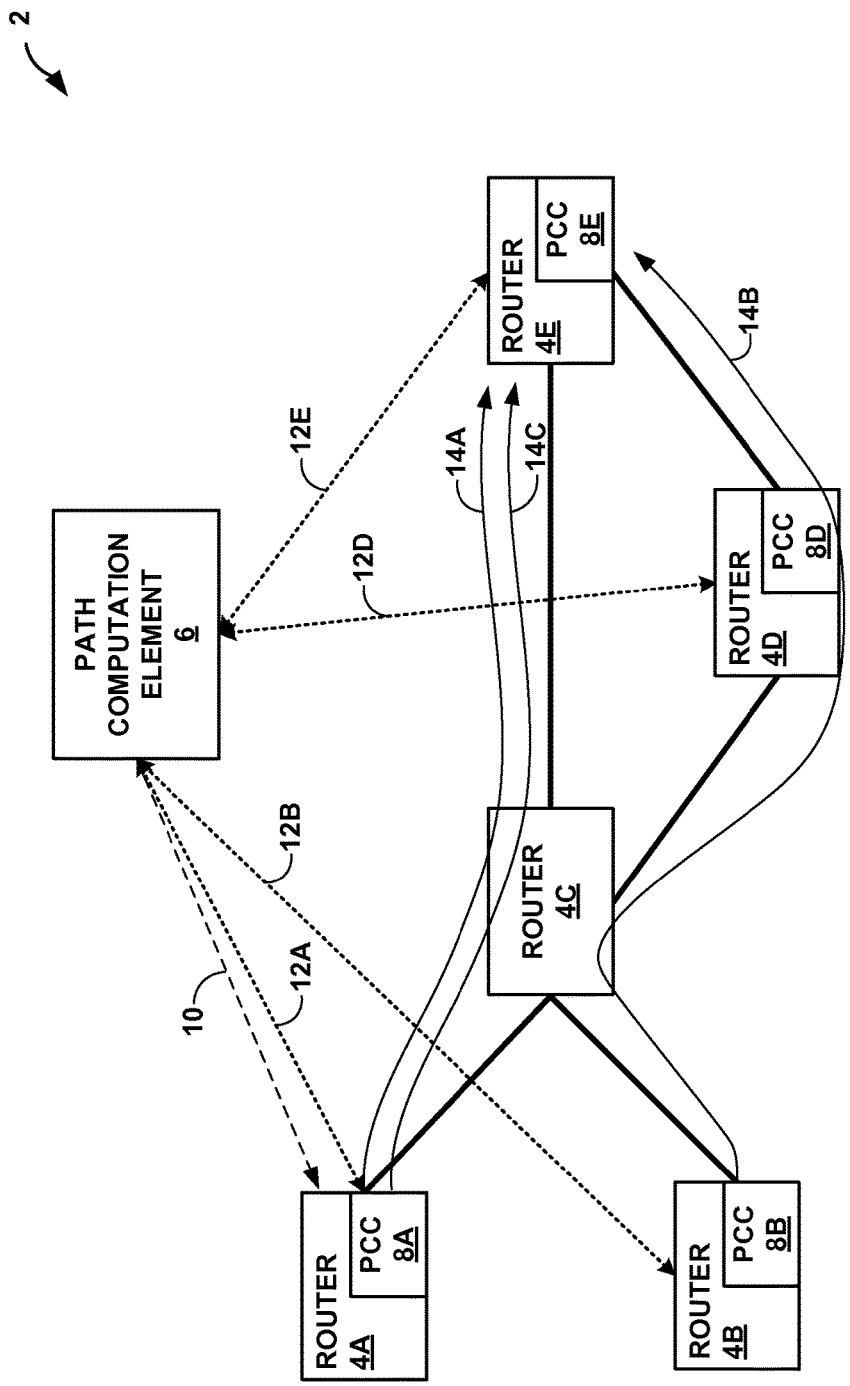
FIG. 1 is a block diagram illustrating a network system in which a path computation element (PCE) is configured to perform various aspects of the traffic mapping techniques set forth in this disclosure.

FIG. 1 is a block diagram illustrating a network system 2 in which a path computation element (PCE) 6 is configured to perform various aspects of the traffic mapping techniques set forth in this disclosure. In this example, network system 2 includes PCE 6 and a plurality of routers 4A-4E ("routers 4") interconnected in the illustrated topology by network links. Routers 4 are members of a path computation domain served by PCE 6. The path computation domain may include, for example, an Interior Gateway Protocol (e.g., Open Shortest Path First (OSPF) or Intermediate System-to-Intermediate System (IS-IS)) area, an Autonomous System (AS), multiple ASes within a service provider network, or multiple ASes that span multiple service provider networks. In various examples, different combinations of routers 4 may include member routers of multiple ASes. As such, network links connecting routers 4 may be interior links, inter-AS transport links, or some combination thereof. While illustrated and described with respect to routers, the techniques may be applicable to any network device that implements Multi-Protocol Label Switching (MPLS) or Generalized MPLS (GMPLS).

PCE 6 uses traffic engineering and LSP state information learned from routers 4 to apply constraints to compute network paths for MPLS traffic engineering LSPs (TE LSPs) both in response to requests from any of routers 4 and autonomously. PCE 6 is an application or other process executing on, for instance, a network node such as one of routers 4, a component of a network node, or an in-network or out-of-network server. To obtain traffic engineering information for storage in a traffic engineering database (not shown in FIG. 1), PCE 6 may execute one or more network routing protocols, extended to carry traffic engineering information, to listen for routing protocol advertisements that carry such traffic engineering information. PCE 6 computes paths for TE LSPs by applying bandwidth and other constraints to learned traffic engineering information. A resulting path may be confined to a single domain or may cross several domains.

Each of routers 4, other than router 4C, includes one of path computation clients 8A-8E ("PCCs 8") that communicates using a corresponding one of extended PCE communication protocol (PCEP) sessions 12A-12E ("extended PCEP sessions 12"). Reference herein to a PCC may additionally refer to router or other network device that includes the PCC. Each of PCCs 8 is an application or other process executed by the router that establishes one of extended PCEP sessions 12 with which to request path computation from PCE 6. One or more (and typically all of) extended PCEP sessions 12 may operate over Transport Control Protocol (TCP) using a well-known port. Router 4C is a core router and is not, in this example, a label edge router (LER) that establishes LSPs and therefore does not include a path computation client. Instead, router 4C is a label switching router (LSR).

Conventional PCEP provides a mechanism for PCCs 8 to issue to PCE 6 a path computation request for one or more TE LSPs. In other words, a PCE executing conventional PCEP operates in a request/reply mode, where PCCs requests a computation and the PCE replies with a result. For each requested TE LSP, the path computation request may include a required bandwidth, a setup/holding priority, the source and destination network addresses, and a request priority. PCE 6 replies with a computed path for a requested TE LSP when the PCE 6 determines a path using the learned traffic information that satisfies the constraints. Upon receiving a response from PCE 6, routers 4 use a resource reservation protocol, such as Resource Reservation Protocol with Traffic Engineering extensions (RSVP-TE), to reserve resources along a computed path and establish TE LSPs to carry traffic mapped to the LSPs. Additional details regarding conventional PCEP may be found in "Path Computation Element (PCE) Communication Protocol (PCEP)," Network Working Group, Request for Comment 5440, March 2009, the entire contents of which being incorporated by reference herein. Additional information on RSVP-TE may be found in "RSVP-TE: Extensions to RSVP for LSP Tunnels", Network Working Group, Request for Comment 3209, December 2001, which is incorporated herein by reference in its entirety.

In the example of FIG. 1, PCC 8A receives from PCE 6 via PCEP session 12A computed paths that causes router 4A to use RSVP-TE to head and establish TE LSPs 14A and 14C that traverses label switching router (LSR) 4C to tail-end label edge router (LER) 4E. Similarly, PCC 8B receives from PCE 6 via PCEP session 12B a computed path that causes router 4B to use RSVP-TE to head and establish TE LSP 14B that traverses LSRs 4C and 4D to tail-end LER 4E. Only three TE LSPs are shown for ease of illustration. In various examples, network system 2 may include any number of TE LSPs connecting different pairs of routers 4. In addition, TE LSPs may recursively include other TE LSPs as virtual links. For example, TE LSP 14B may include, as a virtual link, a TE LSP (not shown) that tunnels labeled traffic from router 4C to router 4D.

Extended PCEP sessions 12 support additional functionality (i.e., beyond that provided by conventional PCEP) to allow PCC 8 to synchronize LSP state information with PCE 6, delegate control over LSPs to PCE 6, and receive LSP modification requests from PCE 6 for delegated LSPs. This additional functionality provided by extended PCEP sessions 12 facilitates a stateful PCE 6 that maintains synchronization not only between PCE 6 and network system 2 topology and resource information, but also between PCE 6 and the set of computed paths and reserved resources in use in the network, as provided by PCCs 8 in the form of LSP state information. Not all of routers 4 need support the described techniques, and each router 4 may advertise to PCE 6 whether it supports the extended functionality described herein.

The synchronized LSP state information learned from PCCs 8 allows PCE 6 to optimize path computations. That is, PCC 8-specific LSP state information synchronization with PCE 6 may provide continually-updated and network-wide visibility on the part of PCE 6 of per-LSP state information and per-router 4 resource availability. This enhanced visibility may enable PCE 6 to improve resource demand placement among TE LSPs 14 headed by respective routers 4A, 4B, over that would otherwise be provided by routers 4A, 4B, computing paths and signaling TE LSPs 14 independently.

In some instances, the extended PCEP sessions 12 also allow PCE 6 to actively update LSP parameters in those PCCs 8 that have delegated control to PCE 6 over one or more LSPs headed by corresponding routers 4. The delegation and control techniques may, for example, allow PCE 6 to trigger LSP re-route, by an LSP head-end router such as any of routers 4, in order to improve LSP placement. In addition, LSP state injection using extended PCEP sessions 12 may further enable to PCE 6 to modify parameters of TE LSPs 14, including bandwidth and state, to synchronously coordinate demand placement, thereby permitting ordered control of path reservations across network routers.

Following a path computation or optimization/recomputation by PCE 6 using synchronized LSP state information and traffic engineering information, it is not enough to know the paths of multiple new LSPs. The sequence of RSVP reservation message (e.g., "RESV" message) arrival at various routers 4 is based on the asynchronous actions of the head-end routers for the LSPs being set up. As a result, reconfiguration of routers 4 does not happen simultaneously. The order in which head-end routers establish LSPs 14 may have a significant effect on total throughput of network system 2. In addition, an old reservation setup from router 4A that is to be torn down may yet be active and take up the bandwidth on links that should be used by a new reservation from router 4B, for instance. LSP state visibility enabled by extended PCEP sessions 12 allows PCE 6 to control the order in which LSPs 14 are brought up for use in forwarding labeled traffic in order to improve total throughput. Because stateful PCE 6 has global demands visibility and the ability to systemically coordinate demand placement, PCE 6 may decouple overall network system 2 usage efficiency from the order in which the LSPs are set up.

PCE 6 may also, in some instances, create new paths in the network. In these instances, PCE 6 may act as a central controller offering an interface by which applications may interface to request new paths. PCE 6 may then decide whether new paths need to provisioned, or whether these new paths are requires for certain applications, such as bandwidth calendaring. The PCEP extensions for allowing a PCE to initiate LSP setup are described in more detail in an Internet Draft denoted "draft-ietf-pce-stateful-pce-lsp-init" by E. Crabbe et al., entitled "PCEP Extensions for Stateful PCE," and dated Oct. 15, 2012, the entire contents of which are hereby incorporated by reference in its entirety. Briefly, PCE 6 may send the PCC a message instructing the PCC to set up an LSP, as well as the parameters needed for the setup. As a result, the PCC signals the LSP. Once the LSP is instantiated, the PCC may automatically delegate the LSP to the PCE, Whether the LSPs are updated or instantiated, PCC 8A and PCC 8B may use locally defined rules to map traffic corresponding to one or more network flows (which are typically identified by a forwarding equivalence class or FEC) to the established TE-LSPs. Often, an administrator manually defines these traffic mapping rules, which can be tedious and prone to error. While automated ways exist to define these traffic mapping rules, e.g., by using various protocols such as a communication protocol referred to as "OpenFlow" that allows for direct configuration of forwarding information in a forwarding plane of a label edge router (LER), these lack the flexibility of mapping on higher-layer information such as the service, and instead focus on information that is encoded in the packet header itself.

In accordance with techniques described in this disclosure, PCE 6 may facilitate automated mapping of traffic to paths, such as traffic engineered multi-protocol label switching (MPLS) label switched paths (TE LSPs), within a network system 2 using a routing protocol that advertises routing information. In effect, the techniques may facilitate such mapping by decoupling the TE LSP identification from the traffic mapping function. In other words, rather than map a forwarding equivalence class (FEC) identifying one or more traffic flows directly to one of TE LSPs 14, the techniques may map the FEC to an LSP tag (which may also be referred to as an LSP color or LSP community in this disclosure) that may then be freely associated with a set of one or more TE LSPs. The techniques may provide for free association and dissociation of the LSP tag to the set of one or more TE LSPs. In this way, a path computation element (PCE) or other network device may "tag" or "un-tag" TE LSPs at any time (meaning at creation of the LSP or after creation of the LSP) with an LSP tag, which is then mapped to a FEC by the routing protocol. The techniques may therefore enable the head-end label edge router (LER), such as router 4A, that admits network flows into the set of one or more of LSPs 14 to identify these network flows mapped to the set of one or more TE LSPs and admit these network flows into the one or more TE LSPs (while, in some instances, providing different forms of load balancing across the one or more TE LSPs).

Moreover, the techniques for tagging/untagging and for mapping, while described with respect to PCE controlled LSPs, are not restricted to PCE controlled LSPs. The techniques may generally apply to any LSPs in the network that can be referenced for tagging purposes. That is, the signaling techniques used for the LSP setup may not be restricted to RSVP-TE, nor the forwarding plane to MPLS (where, for example, GRE tunnels may be also tagged in a similar way).

In operation, PCE 6 may generate an advertisement that conforms to a routing protocol used for advertising routing information, where this advertisement advertises a mapping between a network flow and a label switched path tag. PCE 6 may generate, as one example, a routing advertisement that conforms to a border gateway protocol (BGP). The advertisement may specify a community indicating the mapping between the network flow and the label switched path tag. PCE 6 may specify this community via the BGP network layer reachability information (NLRI) encoding format, effectively extending an existing BGP NLRI used for distributing traffic flow specifications. More information regarding the existing BGP NLRI used for distributing traffic flow specifications can be found in Request for Comments (RFC) 5575, entitled "Dissemination of Flow Specification Rules," dated August 2009 and U.S. Pat. No. 7,773,596, titled "Distribution of Traffic Flow Criteria," issued Aug. 10, 2010, the entire contents of each being hereby incorporated by reference as if set forth in their respective entireties. While described in this disclosure as conforming to BGP, the techniques may employ any form of routing protocol or other communication protocol by which the association between network flows (or some expression thereof, such as a FEC) and the label switched path tag may be defined.

When defining this association between the network flows and the label switched path tag, PCE 6 may specify the community in a manner that also indicates a form or type of load balancing to be performed should the tag be associated with two or more LSPs. PCE 6 may for example generate the BGP routing advertisement (which may also be referred to as a BGP UPDATE message and which is illustrated in the example of FIG. 1 as advertisement 10) to include a community indicating that equal cost multi-path routing is to be performed with respect to the two or more tagged LSPs. PCE 6 may, as another example, generate the BGP routing advertisement (which may also be referred to as a BGP UPDATE message) to include a community indicating that weighted equal cost multi-path routing is to be performed with respect to the two or more tagged LSPs. The weightings may be implicitly determined by the head-end LER according to the bandwidth or other metric associated with the tagged two or more LSPs such that those with a lower bandwidth are associated with a corresponding lower metric (and thereby have less traffic admitted into these LSPs) and those with a higher relative bandwidth are associated with a corresponding higher metric (and thereby have more traffic admitted to these LSPs).

PCE 6 may then generate a communication associating the label switched path tag with a label switched path. This communication may conform to PCEP or any other communication protocol. In effect, PCE 6 may tag or otherwise mark, color or associate the TE LSP with the tag. For example, PCE 6 may select TE LSP 14A and generate the PCEP message to associate the LSP tag with TE LSP 14A. PCE 6 may also select TE LSP 14C and generate the PCEP message to associate the same LSP tag with TE LSP 14C. In this manner, PCE 6 may identify one or more LSPs to be used for the network flows specified in the BGP routing advertisement. In some instances, rather than by identified by PCC 6, the one or more LSPs may be identified via a local configuration, e.g., by an administrator or other network operator interfacing with the PCCs to locally configure the identified one or more LSPs.

PCE 6 may then transmit advertisement 10 in accordance with the routing protocol, i.e., BGP in this example, to head-end LER 4A that admits traffic into LSPs 14A, 14C identified by the LSP tag. PCE 6 may also transmit the communication via PCEP session 12A to LER 4A such that the LER 4A is able to process the communication in conjunction with the advertisement to map the specified network flow to those LSPs identified by the LSP tag, i.e., LSPs 14A and 14C in the example of FIG. 1.

That is, LER 4A that admits network traffic to LSPs 14A and 14C may receive advertisement 10 from PCE 6 and receive the communication via PCEP session 12A. LER 4A may then process the communication and the advertisement to map the network flow to LSPs 14A and 14C identified by the LSP tag. LER 4A may include a control unit comprising both a routing plane and a forwarding plane. LER 4A may execute a BGP instance in the routing plane upon receiving advertisement 10, the BGP instance configured to process advertisement 10 and update routing information stored to the routing plane (often in what is referred to as a routing information base or "RIB") to include the association between the network flows and the LSP tag. LER 4A may also execute an instance of PCEP, the instance of PCEP configured to process the communication and update a traffic engineering database to include the association between the LSP tag and LSPs 14A and 14C.

The routing plane, when executing the BGP instance, may resolve the updated routing information in view of the link state database to generate forwarding information that provides for a chain of next hops with corresponding actions (which in the context of MPLS may include specifying whether a label is to be pushed onto the label stack appended to packets admitted to a particular LSP, swapped in this label stack or popped from the label stack). The chain of next hops may identify a next hop for each of LSPs 14A and 14C in this example, each of which specifies that a label is to be pushed onto the label stack appended to packets admitted to each LSP. The forwarding information may also define the criteria (or flow specifications) for admitting the packets to LSPs 14A and 14C, while also defining how the mapping of packets to multiple LSPs 14A and 14C is to be handled (e.g., by performing equal cost multi-path or weighted equal cost multi-path). The routing plane of LER 4A may then install this forwarding information in the forwarding plane, which may begin processing network traffic corresponding to the network flow to forward the packets via one of LSPs 14A and 14C identified by the label switched path tag.

Figure 2:
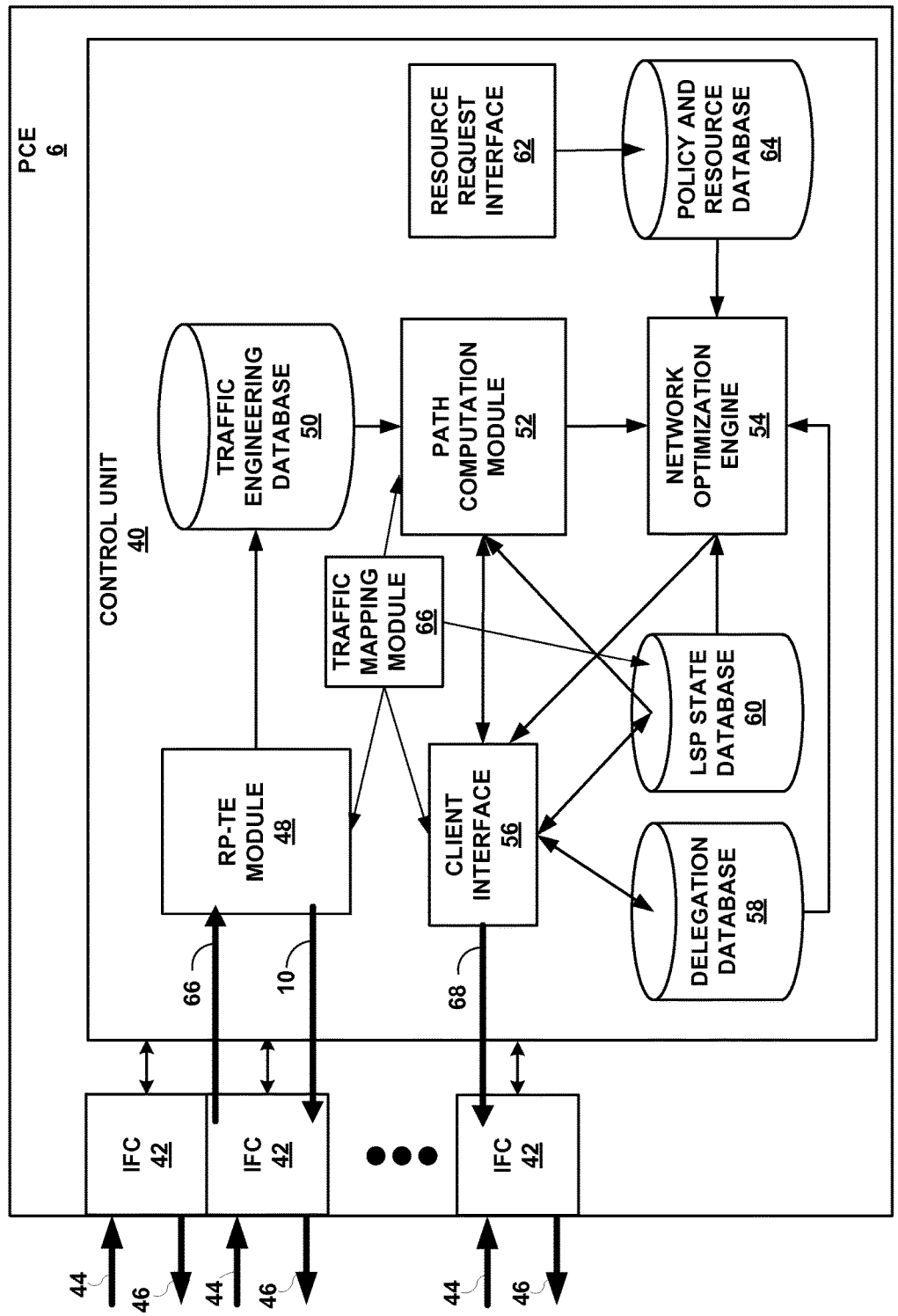
FIG. 2 is a block diagram illustrating an example of a stateful path computation element that performs the automated traffic mapping techniques described in this disclosure.

FIG. 2 is a block diagram illustrating an example of a stateful path computation element that performs the automated traffic mapping techniques described in this disclosure. Stateful PCE 6, in this example, includes control unit 40 coupled to interface cards 42 ("IFCs 42") for receiving packets via input links 44 ("input links 44") and sending packets via output links 46 ("output links 46").

Control unit 40 may comprise one or more processors (not shown in FIG. 2) that execute software instructions, such as those used to define a software or computer program, stored to a computer-readable storage medium, such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 40 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Routing protocol with traffic engineering extensions module 48 ("RP-TE module 48") is a process of control unit 40 that executes one or more routing protocols extended to advertise and receive traffic engineering (TE) information. RP-TE module 48 may, for example, execute Intermediate System-to-Intermediate System with TE extensions (IS-IS-TE) or Open Shortest Path First with TE extensions (OSPF-TE). In some instances, RP-TE module 48 executes Border Gateway Protocol to receive advertised TE information for inter-AS and other out-of-network links. Additional details regarding executing BGP to receive TE info are found in U.S. patent application Ser. No. 13/110,987, filed May 19, 2011 and entitled "DYNAMICALLY GENERATING APPLICATION-LAYER TRAFFIC OPTIMIZATION PROTOCOL MAPS," which is incorporated herein by reference in its entirety.

Traffic engineering information received by RP-TE module 48 includes topology information for the path computation domain served by PCE 6. Such TE information includes one or more of the link state, administrative attributes, and metrics such as bandwidth available for use at various LSP priority levels of links connecting routers of the domain. RP-TE module 48 stores TE information in traffic engineering database (TED) 50, which is stored by a computer-readable storage medium for use in path computation.

Client interface 56 of control unit 40 implements PCE communication protocol (PCEP) extensions to receive and send extended PCEP messages noted above. That is, client interface 56 establishes extended PCEP sessions with one or more path computation clients (PCCs) operating on MPLS-enabled routers in the network. Via the extended PCEP sessions, client interface 56 receives LSP state reports 66 that include up-to-date LSP state for LSPs owned by the corresponding clients, which client interface 56 stores to LSP state database 60. LSP state reports may be included in PCRpt messages. LSP state, received by client interface 56 and stored to LSP state database 60, for an LSP may include, for example, the LSP status (e.g., up/down), symbolic name for inter-PCEP session persistence, LSP attributes such as setup priority and hold priority, number of hops, the reserved bandwidth, a metric that has been optimized for the LSP (e.g., an IGP metric, a TE metric, or hop counts), and a path followed by the LSP. In this way, client interface 56 maintains strict synchronization between PCE 6 and the set of computed paths and reserved resources in use in the network in addition to TED 50 having synchronized TE information received by operation of RP-TE listener 48.

In addition, where PCE 6 is an active stateful PCE, client interface 56 may advertise PCE 6 as having an LSP update capability. As a result, LSP state reports received by client interface 56 may in some case include a delegation that provides access rights to PCE 6 to modify parameters of the target LSP. In some instances, the delegation may specify the particular parameters of the target LSP that are exposed for modification. Client interface 56 stores such delegation information to delegation database 58, which may associate the delegation information with LSP identifiers that also identify LSPs in LSP state database 60. Client interface 56 also implements functionality for the operation of conventional PCEP, such as path computation request/reply messages.

Resource request interface 62 of control unit 40 provides an interface by which applications and/or operators may request TE LSPs having particular characteristics, such as source/destination and guaranteed bandwidth. Applications and operators may also use resource request interface 62 to inspect LSP state information and modify parameters of LSPs identifiable by their respective symbolic names. For example, PCE 6 may receive via resource request interface 62 a resource request message from an application that identifies an LSP by its symbolic name. In response, resource request interface 62 returns a digest of LSP state information for the identified LSP to the application. Resource request interface 62 stores resource requirements corresponding to the requests in policy and resource database 64, which may also store policies that determine the operation of PCE 6, in particular of network optimization engine 54, upon the occurrence of specified conditions.

Network optimization engine 54 executing on control unit 40 uses TE information of TED 50, LSP state information stored to LSP state database 60, and/or delegation information stored to delegation database 58 to identify permissible modifications to existing, delegated LSPs that further normative goals of the network operator, which may be expressed in policy and resource database 64. Such goals may include maximizing total throughput and/or fostering bandwidth allocation fairness for requested resources, for instance. Network optimization engine 54 may invoke path computation module 52 of control unit, executes contrained SPF (CSPF) using supplied constraints to determine a set of paths from a source to a destination that satisfy the constraints. LSP state information stored to LSP state database 60 may supply constraints and link metrics to path computation module 52 for both passive stateful and active stateful instances of PCE 6.

Upon determining modifications to parameters of one or more LSPs delegated to PCE 6 by a PCC, network optimization engine 54 directs client interface 56 to send LSP update requests 68 that specify the LSP parameter modifications for each of the LSPs. LSP update requests 68 may be included in PCUpd messages. More information regarding extended PCE session and the messages that facilitate stateful instances of PCEs can be found in U.S. application Ser. No. 13/324,861, filed Dec. 13, 2011, entitled "PATH COMPUTATION ELEMENT COMMUNICATION PROTOCOL (PCEP) EXTENSIONS FOR STATEFUL LABEL SWITCHED PATH MANAGEMENT," the entire contents of which are hereby incorporated by reference as if set forth in its entirety herein.

Once the various LSPs, such as LSPs 14 shown in the example of FIG. 1, are established, RP-TE module 48 may then generate a BGP UPDATE message advertising the association between one or more network flows (which may be identified by a forwarding equivalence class (FEC)) with an LSP tag. The LSP tag may be any value and often is defined by a network administrator or other network operator. The LSP tag may, for example, identify a color that may loosely identify a bandwidth or other network metric associated with the associated LSP. For example, the LSP tag may comprise a "gold" tag that can then be associated with one or more LSPs that provide bandwidth within so-called "gold" bandwidth range. The LSP tag may, as another example, include a "low latency" tag that identifies one or more LSPs that provide what is considered to be a "low latency" path through the network. RP-TE module 48 may then transmit this advertisement, such as advertisement 10, to one or more of its BGP peers, e.g., one or more of routers 4.

RP-TE module 48 may, when generating BGP UPDATE message 10, may also update TE database 50 to store the association between the LSP tag and the one or more flows. In some instances, RP-TE module 48 may store this association locally in a table or other data structure and pass this association to traffic mapping module 66. Traffic mapping module 66 represents a module configured to identify this association advertised via the BGP UPDATE message 10 and then identify those of the LSPs stored to LSP state database 60 that are to be tagged with the LSP tag advertised via the BGP UPDATE message 10. Traffic mapping module 66 may be configured to identify flows to be associated with LSP tags using a set of traffic mapping rules. In some instances, the network administrator or other network operator may define these traffic mapping rules. In other instances, traffic mapping module 66 may define traffic mapping rules automatically (meaning, without requiring any user input)

based on known network criteria or characteristics. For example, traffic mapping module 66 may identify all flows destined for a certain port associated with gaming, such as TCP port 3074, TCP port 3724, TCP port 6112, or TCP port 6113 to provide a few examples, to a "gold" LSP tag. Traffic mapping module 66 may apply these rules to map traffic flows to the LSP tag. Traffic mapping module 66 may communicate this association between the traffic flows the LSP tag to RP-TE module 48, which may then generate and transmit the BGP UPDATE message 10 specifying this association between the traffic flow and the LSP tag.

Traffic mapping module 66 may also access LSP state database 60 to identify one or more LSPs, such as LSPs 14A and 14C, with which to tag with the LSP tag. Traffic mapping module 66 may utilize the traffic mapping rules to identify which of the LSPs to tag with the LSP tag. After identifying these LSPs, traffic mapping module 66 may tag or otherwise associate the identified LSPs with the LSP tag. Traffic mapping module 66 may store the association between the LSPs and the LSP tag to the LSP state database 60. Traffic mapping module 66 may interface with client interface 56 to provide this LSP-to-LSP tag association to the client interface 56 so that the client interface 56 may generate the PCEP message or other communication associating the LSP to the LSP tag. Client interface 56 may then transmit this PCEP message to the head-end LER, such as LER 4A. In this way, the techniques may enable PCE 6 to separate the association of traffic flows from individual LSPs and thereby potentially enable more flexible associations between traffic flows and LSPs by way the LSP tag mechanism.

To illustrate this flexibility, consider that PCE 6 is aware of the state of possibly a large number of LSPs (as stored in LSP state database 60) and can therefore identify whether various traffic flows are receiving adequate service in terms of bandwidth availability, latency times and other network metrics. Should a large number of gamers, for example, log into the gaming servers and begin online gaming session, PCE 6 and, more specifically, traffic mapping module 66 may determine that a single LSP, such as LSP 14A, which had been previously tagged to be used for these gaming network flows, has limited available bandwidth and higher latency. Traffic mapping module 66 may determine that, based on the traffic mapping rules, LSP 14A is insufficient to meet the demands of the increased gaming activity. Traffic mapping module 66 may then identify another LSP, such as LSP 14C, as sufficient to meet the increased demand for these gaming services and tag this LSP 14C with the same tag used to tag LSP 14A. Traffic mapping module 66 may then interface with client interface 56 to communicate this new association between this "gaming" tag and LSP 14C using a PCEP message (in this instance) to LER 4A. As a result of the visibility of PCE 6 with regard to these paths in the network, PCE 6 may automatically increase the number of LSPs used to service a given set of one or more network flows.

Similarly, when demand for these gaming services wanes, traffic mapping module 66 may "untag" LSP 14C or, in other words, remove the association between LSP 14C and this gaming LSP tag. Traffic mapping module 66 may then interface with client interface 56 to communicate the removal of this association using a PCEP message to LER 4A. In this way, the techniques may enable free association and disassociation of tags to LSPs based on network demand as measured in terms of bandwidth, latency or other network metrics.

In some instances, traffic mapping module 66 may be unable to identify an LSP with sufficient state to support increased number of network flows. Traffic mapping module 66 may, in these instances, communicate with path computation module 52 to request that a new LSP be established with the required constraints to support the increased number of network flows. Path computation module 52 may then compute this path and communicate this path to the head-end LER of the LSP to be established via PCEP messages generated by client interface 56. Client interface 56 may update LSP state database 60, which traffic mapping module 66 may then tag with the gaming tag. Likewise, traffic mapping module 66 may, when the number of traffic flows decreases, then interface with client interface 56 to remove this new LSP.

Figure 3:
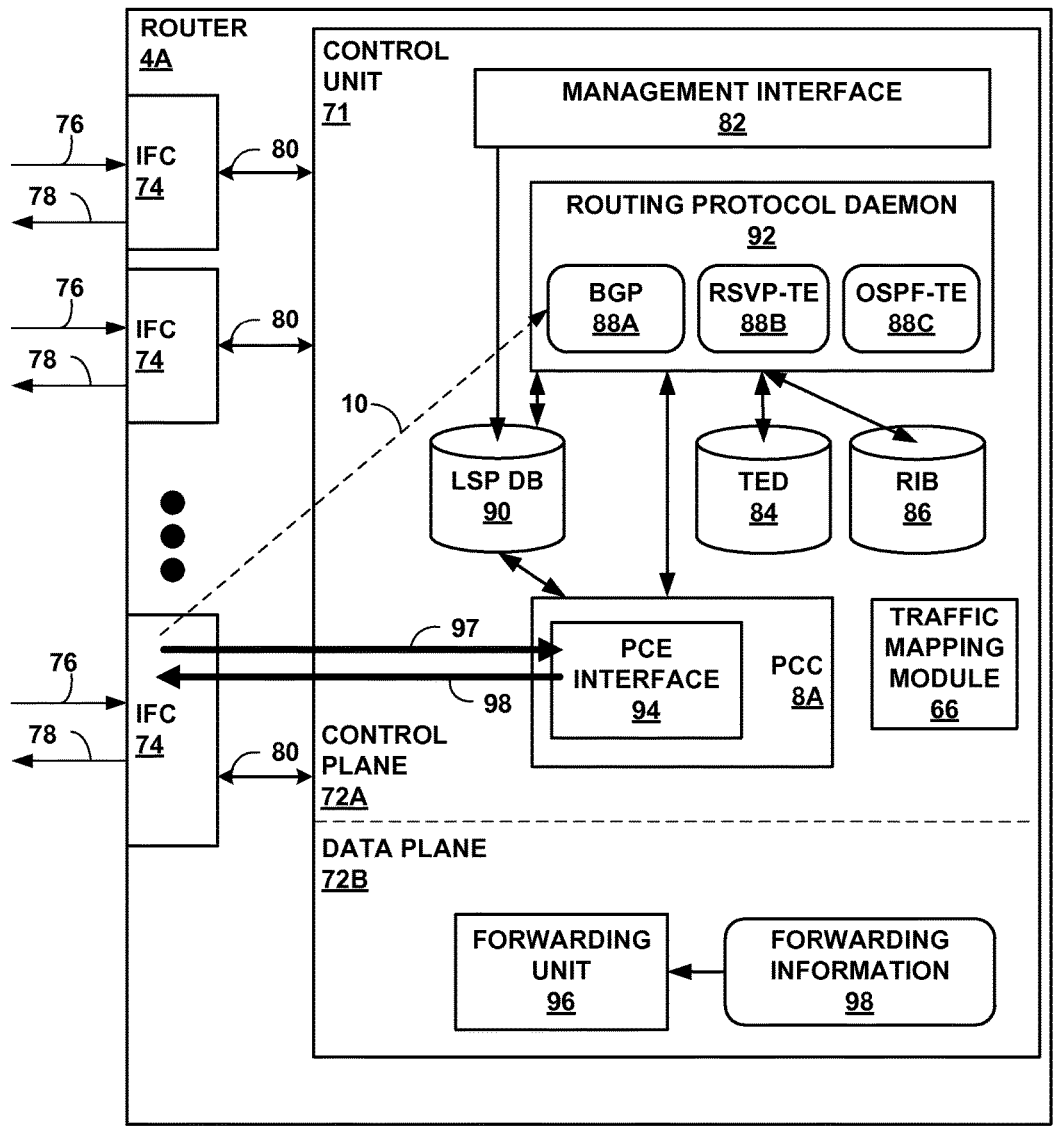
FIG. 3 is a block diagram illustrating an example router that establishes and uses extended PCEP sessions to a path computation element in accordance with techniques described in this disclosure.

FIG. 3 is a block diagram illustrating an example router that establishes and uses extended PCEP sessions to a path computation element in accordance with techniques described in this disclosure. For purposes of illustration, router 4A may be described below within the context of an exemplary network system 2 of FIG. 1 and may represent any one of routers 4. Moreover, while described with respect to a particular network device, e.g., a router, the techniques may be implemented by any network device that executes MPLS/GMPLS to establish and operate LSPs. The techniques should therefore not be limited to the exemplary embodiments described in this disclosure.

Router 4A includes a control unit 71 and interface cards (IFCs) 74 coupled to control unit 71 via internal links 80. Control unit 71 may comprise one or more processors (not shown in FIG. 3) that execute software instructions, such as those used to define a software or computer program, stored to a computer-readable storage medium (again, not shown in FIG. 3), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 71 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 71 is divided into two logical or physical "planes" to include a first control or routing plane 72A ("control plane 72A") and a second data or forwarding plane 72B ("data plane 72B"). That is, control unit 71 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 72A of control unit 71 executes the routing functionality of router 4A. In this respect, control plane 72A represents hardware or a combination of hardware and software of control unit 71 that implements, in routing protocol daemon (RPD) 92, protocols 88 by which routing information stored in routing information base 86 ("RIB 86") may be determined. RIB 86 may include information defining a topology of a network, such as network 2 of FIG.

1. RPD 92 may resolve the topology defined by routing information in RIB 86 to select or determine one or more routes through the network. RPD 92 may then update data plane 72B with representations of these routes, where data plane 72B maintains these representations as forwarding information 98.

Routing protocols of protocols 88 executed by RPD 92 include, in this example, Border Gateway Protocol 88A and Open Shortest Path First with Traffic Engineering extensions (OSPF-TE) 88C. BGP 88A may generally represent a module or other unit configured to perform both BGP with flow specification extensions and BGP with traffic engineering extensions. RPD 92 executes these protocols to advertise and receive routing and traffic engineering information from other routers, including autonomous system border routers of external ASes and routers within a routing domain in which router 4A participates. Various other examples may implement other link-state or vector-distance protocols to exchange traffic engineering with other routers. RPD 92 stores received traffic engineering information in traffic engineering database 84 (illustrated as "TED 84"), which is stored by a non-transitory computer-readable storage medium. TED 84 may subsume RIB 86 in some instances to store all traffic engineering information in a single data structure. TED 84 may store, for example, one or more of the link state, administrative attributes, and metrics such as bandwidth available for use at various LSP priority levels of links connecting router 4A to other routers of an MPLS domain.

Forwarding or data plane 72B represents hardware or a combination of hardware and software of control unit 71 that forwards network traffic in accordance with forwarding information 98 that includes network destinations of output links 78 as well as MPLS forwarding information such as LSP label mappings that associate outbound labels and interfaces to inbound labels received on incoming traffic. Data plane 72B includes a forwarding unit 96 that provides high-speed forwarding of network traffic received by interface cards 74 via inbound links 76 to outbound links 78. Forwarding unit 96 may represent a packet forwarding engine (PFE). Further details of one example embodiment of a router can be found in U.S. patent application Ser. No. 12/182,619, filed Jul. 30, 2008, and entitled "STREAMLINED PACKET FORWARDING USING DYNAMIC FILTERS FOR ROUTING AND SECURITY IN A SHARED FORWARDING PLANE," which is incorporated herein by reference.

Control plane 72A further includes management interface 82 by which a network management system or in some instances an administrator using a command line or graphical user interface configures label switched paths described in LSP database 90 (illustrated as "LSP DB 90"). LSP database 90 includes LSP configuration data, for example, an LSP destination, setup/hold priorities, path (e.g., an RRO), metrics, and other LSP attributes such as those described herein. LSP database 90 also includes information designating zero or more attributes of each configured LSP as delegable parameters that may be set/modified by a PCE using extended PCEP to modify the operation of the LSP when set up in the network. LSP attributes may be divided into three categories: (1) non-delegable parameters that RPD 92 applies immediately via RSVP-TE 88B and are neither re-signaled nor overridden by a PCE, (2) delegable parameters that RPD 92 applies when the LSP is re-signaled due, e.g., to LSP failure, and (3) delegable parameters that may be overridden by a PCE and trigger re-signaling by RPD 92. All delegable LSP parameters may include a configured default value that RPD 92 applies when, for example, a PCEP session terminates, the PCE otherwise becomes unavailable, or the PCE returns a delegation.

Although described in the context of a management system creating entries in LSP database 90, the techniques may be performed in the context of an active stateful PCE that may be included within the functionality of the management system or as an additional agent for instantiating LSPs in the network.

RPD 92 sets up LSP described in LSP database 90 by executing a resource reservation protocol, which in this instance is Resource Reservation Protocol with Traffic Engineering extensions (RSVP-TE) 88B, that signals other routers in the network to reserve resources and provide MPLS forwarding information to RPD 92 for use in forwarding MPLS packets. Various instances of router 4A may also, or alternatively, use standard RSVP (i.e., without traffic engineering extensions) or Label Distribution Protocol (LDP) to signal LSPs. In addition, RPD 92 executes protocols 88 to receive traffic engineering information that affects the state of LSPs, such as failed links and preempted resources that may result in a down state for LSPs. RPD 92 may associate such LSP state information with corresponding LSPs in LSP database 90 and may further directs PCC 8A to send one or more LSP state reports to a PCE in response, as described in further detail below.

That is, path computation client (PCC) module 8A of control plane 72A mediates communication between RPD 92 and a path computation element. PCC 8A includes PCE (PCE) interface 94 that implements PCE communication protocol (PCEP) extensions to receive and send extended PCEP messages. PCE interface 94 may also implement functionality for the operation of conventional PCEP, such as path computation request/reply messages, but may not necessarily implement this functionality to support the techniques described in this disclosure.

PCE interface 94 establishes extended PCEP sessions with one or more PCEs and sends, via the extended PCEP sessions, LSP state reports 98 that include up-to-date LSP state for LSPs described in LSP state information. LSP state reports may be included in PCRpt messages. In this way, PCC 8A maintains strict LSP state synchronization between router 4A and the PCEs.

In addition, PCE interface 94 may advertise router 4A as allowing modification of delegable parameters. As a result, LSP state reports sent by PCE interface 94 may in some case include a delegation that provides access rights to a PCE to modify parameters of the target LSP. In some instances, the delegation may specify the particular parameters of the target LSP that are exposed for modification. PCE interface 94 may, after delegating LSPs, receive LSP update requests 97 that specify LSP parameter modifications for one or more of the LSPs. LSP update requests may be included in PCUpd messages. PCC 8A, in response, notifies RPD 92 of new parameters for target LSPs identified in LSP update requests 98. RPD 92 may re-signal the target LSPs, in turn, and as new LSPs are established, switch traffic over to the new LSPs and send a notification to PCC 8A that the new LSPs have been successfully signaled. PCE interface 94 provides this updated LSP state in LSP status reports to one or more PCEs with router 4A has extended PCEP sessions. Router 4A thus extends existing RSVP-TE functionality with an extended PCEP protocol that enables a PCE to set parameters for a TE LSP configured within the router.

In the example of FIG. 3, RPD 92 may receive BGP UPDATE message 10 generated by PCE 6 via one of IFCs 74. RPD 92 may invoke BGP 88A to process BGP UPDATE message 10, whereupon BGP 88A may determine the association between traffic flows and the LSP tag specified in BGP UPDATE message 10. BGP 88A may then update RIB 86 and/or TED 94 with this determined flow-to-LSP tag association. PCE interface 94 may receive another PCEP message 98 via one of IFCs 74, where this PCEP message 98 specifies an association between the LSP tag and one or more LSPs head-ended by LER 4A. PCE interface 94 may interface with LSP DB 90 and store the association between the LSP tag and one or more of LSPs specified in LSP DB 90. While described with respect to PCEP, the techniques may be performed with respect to other protocols.

BGP 88A may, when resolving one or more of RIB 86 and/or TED 94, utilize the flow specification extensions (which may be further extended in accordance with the techniques described in this disclosure to provide a new match function) to match the traffic flows specified in BGP UPDATE message to the LSPs specified in LSP DB 90 as being tagged with the LSP tag specified in BGP UPDATE message 10. BGP 88A may resolve RIB 86 and/or TED 94 to generate forwarding information (or updates thereto) that define matching rules for admitting the identified traffic flows into the corresponding tagged LSPs. This forwarding information may be in the form of chained next hops with each next hop in the chain identifying a next hop for a different one of the tagged LSPs. BGP 88A may install this forwarding information (or updates thereto) in data plane 72B, which forwarding unit 96 may then utilize when admitting traffic to the tagged LSPs.

In some examples, BGP 88A may also indicate in RIB 86 and/or TED 84 a type or form of load balancing to be performed when admitting traffic to the tagged LSPs. BGP 88A may resolve RIB 86 and/or TED 84 in these instances to generate forwarding information 98 or updates thereto that provides for this form of load balancing (equal cost multipath or weighted equal cost multipath) in the chain of next hops. When this load-balanced augmented forwarding information is installed, forwarding unit 96 may perform this load balancing with respect to the LSPs, where in the instance of weighted equal cost multipath forwarding unit 96 may load balance the traffic flows based on the available bandwidth metric of each LSP or some other network metric (such as latency).

As noted above with respect to the example of FIG. 2, PCE 6 may freely tag LSPs head-ended by LER 4A by issuing additional PCEP messages 98 specifying new associations between the same LSP tag and new or additional LSPs. Likewise, PCE 6 may freely un-tag LSPs head-ended by LER 4A by issuing additional PCEP messages 98 identifying existing associations between the LSP tag and one or more LSPs that are to be removed. In this way, the techniques permit a network device, such as PCE 6, to freely adapt the number and type of LSPs used to support a set of one or more traffic flows based, for example, on network conditions. PCE 6 may accomplish this adaptation without having to re-issue new BGP UPDATE messages.

Figure 4:
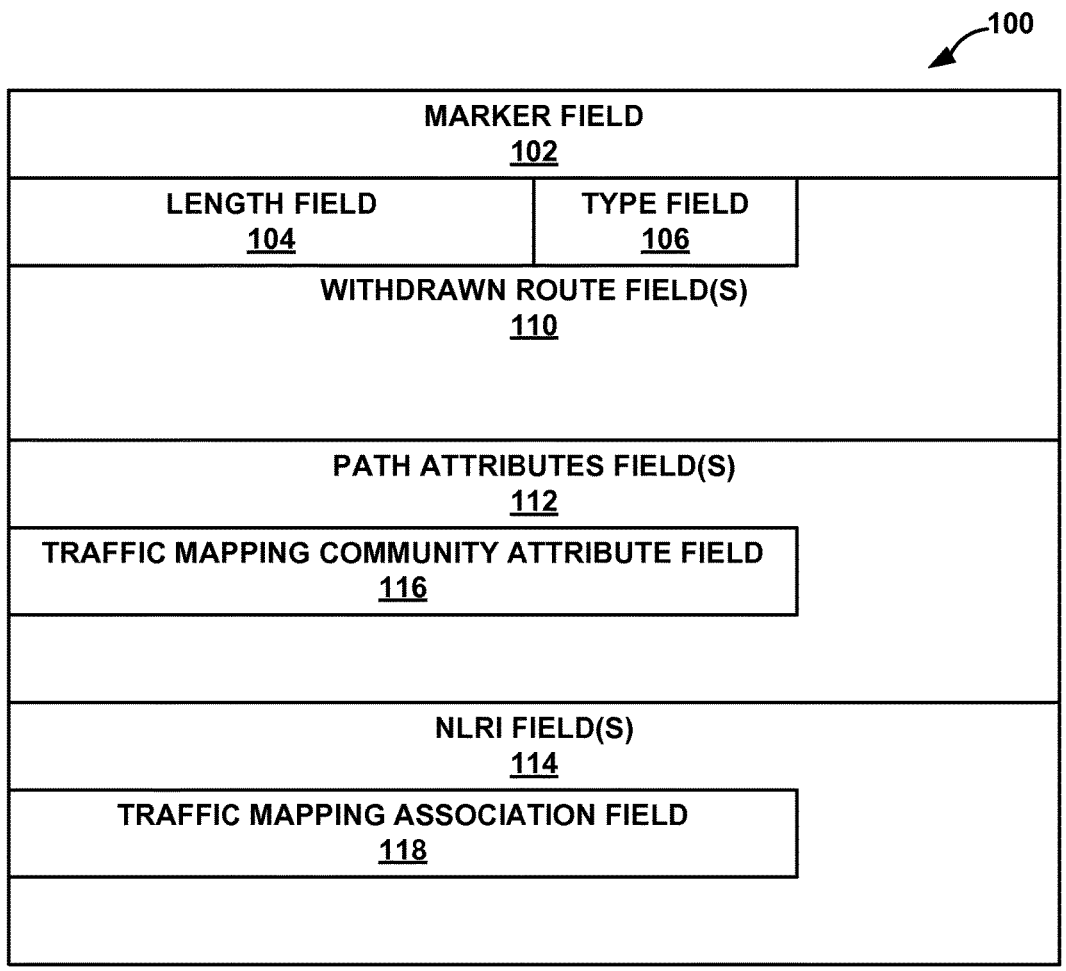
FIG. 4 is a diagram illustrating an example of a BGP UPDATE message that specifies an association between traffic flows and an LSP tag in accordance with the techniques described in this disclosure.

FIG. 4 is a diagram illustrating an example of a BGP UPDATE message 100 that specifies an association between traffic flows and an LSP tag in accordance with the techniques described in this disclosure. In the example of FIG. 4, BGP UPDATE message 100 includes a marker field 102, a length field 104, a type field 106, a withdrawn route fields 110, path attributes fields 112 and network layer reachability (NLRI) fields 114 ("NLRI fields 114").

Marker field 102 is typically used to store data for synchronization and authentication. Length field 104 represents a field that may specify the total length of the message in bytes (given that UPDATE messages are generally variable in length). Type field 106 represents a field that stores a value indicating the type of the message. For BGP UPDATE messages, the type field is set to a value of two. Withdrawn routes fields 110 may represent one or more fields used to indicate that one or more routes previously advertised have been withdrawn. BGP UPDATE message 100 does not necessarily include, in every instance, withdrawn routes fields 110. There may be one or more fields of withdrawn routes fields 110 dedicated to removal of a single route. Also, there may be more than one route withdrawn at any given time using withdrawn routes fields 110. Path attributes fields 112 represent one or more fields used to describe the path attributes of the route advertised. Because some attributes require more information than others, attributes are described using a flexible structure (similar to a type-length-value sub-field structure) that minimizes message size compared to using fixed fields that would often be empty. NLRI fields 114 generally represent one or more fields used to express a list of IP address prefixes for the route being advertised.

As further shown in the example of FIG. 4, path attribute fields 112 may include a traffic mapping community attribute field 116. Traffic mapping community attribute field 116 may represent one or more sub-fields (e.g., the type-length-value sub-fields) for specifying either an equal cost multipath traffic mapping community value or a weighted equal cost multipath traffic mapping community value. That is, the techniques may provide for the extensions set forth in the following table to BGP flow specification:

| type | extended community | encoding |
|------|--------------------|-----------|
| 0x800b | redirect-ECMP | opaque 6-byte LSP-TAG |
| 0x800c | redirect-WECMP | opaque 6-byte LSP-TAG |

The redirect-ECMP community may load balance the traffic equally over all LSPs that are tagged with the LSP-tag matching its value. If the number of LSPs exceeds the router's capacity of ECMP, the process for selecting those LSPs that are to be used for forwarding may be determined locally. The redirect-WECMP community load balances the traffic proportionately with the sizes of the LSPs tagged with an LSP-tag matching its value. If the number of LSPs exceeds the router's capacity of ECMP, the process for selecting those LSPs that are to be used for forwarding may be determined locally. If the router does not support load balancing proportionally with the sizes of the LSPs, an error is thrown.

NLRI fields 114 may include a traffic mapping association field 118. Traffic mapping association field 118 may represent an extension of a field for storing flow specifications, which are encoded in the variable-length flow specification NLRI described in section 4 of RFC 5575. This traffic mapping association field 118 may specify an association between one or more flows and one or more LSP tags in accordance with the techniques described in this disclosure.

Figure 5:
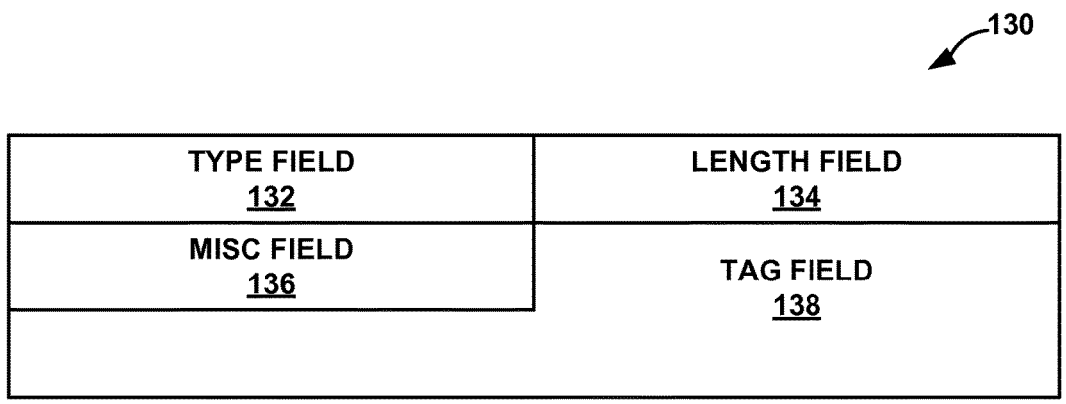
FIG. 5 is a block diagram illustrating an example of a type-length-value object that may be included within a link state protocol object carried by a link state protocol update message or a link state protocol report message in accordance with various aspects of the techniques described in this disclosure.

FIG. 5 is a block diagram illustrating an example of a type-length-value object that may be included in a PCEP message (e.g., either a report or update message) in accordance with various aspects of the techniques described int his disclosure. In the example of FIG. 5, a type-length-value (TLV) object 130 includes a type field 132, a length field 134, a miscellaneous field 136 and a tag value field 138.

Type field 132 may represent a field that specifies a value indicating the type of the TLV. The length field 134 represents a field that specifies a length of tag value field 138. Miscellaneous field 136 represents a field that specifies various flags and other bits that may be reserved for future use. Miscellaneous field 136 may specify a disassociate (D) flag that may be set when used in certain LSP objects, such as a PCUpd (or PC Update message). The LSP tag value field 138 represents a field that specifies the LSP tag associated with the LSP to which the LSP object that includes this TLV 130 identifies.

In other words, this LSP-TAG TLV 130 may represent an optional TLV for use in the LSP Object. The type field 132 of the TLV identifies this as the LSP tag, and the flags specified in miscellaneous field 136 define a single flag, the dis-association flag (D). When D=1, the receiving router is to disassociate the tag specified in TLV 130 from the LSP specified in the LSP object. On a PCUpd message, the D flag may be set by PCE 6 to request a disassociation of a tag it previously set. In a PCRpt message, PCC may report all the tags associated with an LSP. If a TAG is missing, it is considered removed (this is to support reporting associations communicated via different mechanisms, for example configuration, as well as associations established by PCE 6). When not supported, PCC may either perform a capability negotiation or just ignore this unknown TLV 130.

Figure 6:
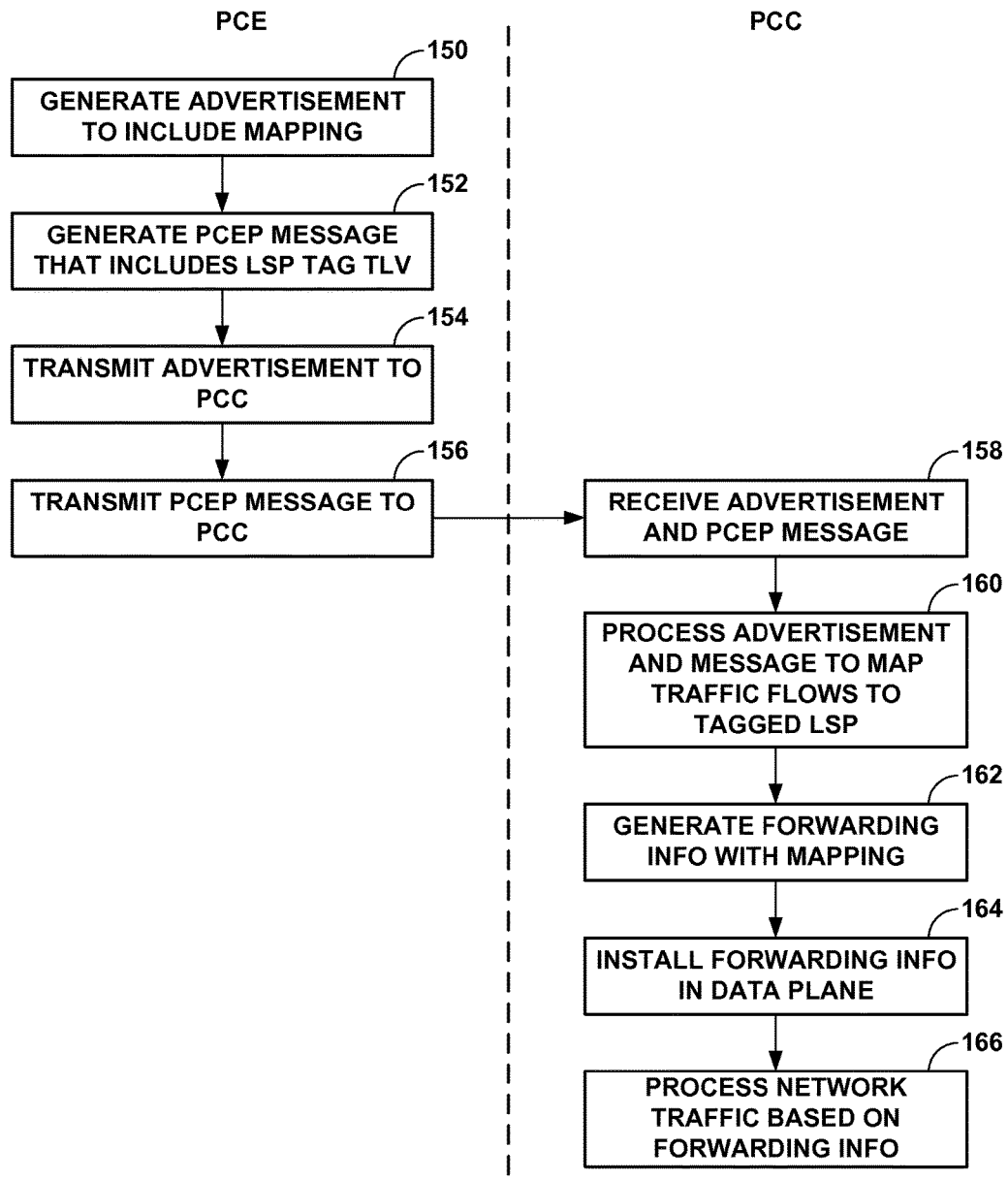
FIG. 6 is a flowchart illustrating operation of a PCE and a PCC in performing various aspects of the traffic mapping techniques described in this disclosure.

FIG. 6 is a flowchart illustrating operation of a PCE and a PCC in performing various aspects of the traffic mapping techniques described in this disclosure. In operation, a PCE, such as PCE 6 shown in the example of FIG. 2, may generate an advertisement 10 that conforms to a routing protocol used for advertising routing information, where this advertisement advertises a mapping between a network flow and a label switched path tag (150). PCE 6 may generate, as one example, a routing advertisement 10 that conforms to a border gateway protocol (BGP). As described above in more detail, when defining this association between the network flows and the label switched path tag, PCE 6 may specify the association in a manner that also indicates a form or type of load balancing to be performed should the tag be associated with two or more LSPs.

PCE 6 may then generate a PCEP message or other communication associating the label switched path tag with a label switched path (152). This communication may conform to PCEP or any other communication protocol. In effect, PCE 6 may tag or otherwise mark, color or associate the TE LSP with the tag. For example, PCE 6 may select TE LSP 14A and generate the PCEP message to associate the LSP tag with TE LSP 14A. PCE 6 may also select TE LSP 14C and generate the PCEP message to associate the same LSP tag with TE LSP 14C. In this manner, PCE 6 may identify one or more LSPs to be used for the network flows specified in the BGP routing advertisement.

PCE 6 may then transmit advertisement 10 in accordance with the routing protocol, i.e., BGP in this example, to a head-end LER, such as PCC 4A (which may also be referred to as a LER 4A), that admits traffic into LSPs 14A, 14C identified by the LSP tag (154). PCE 6 may also transmit the communication via PCEP session 12A to LER 4A such that the LER 4A is able to process the communication in conjunction with the advertisement to map the specified network flow to those LSPs identified by the LSP tag, i.e., LSPs 14A and 14C in the example of FIG. 1 (156).

That is, LER 4A that admits network traffic to LSPs 14A and 14C may receive advertisement 10 from PCE 6 and receive the communication via PCEP session 12A (158). LER 4A may then process the communication and the advertisement to map the network flow identified in routing advertisement 10 to any LSPs identified by the tag specified in routing advertisement 10, i.e., LSPs 14A and 14C in this example, which were associated with the LSP tag by way of the PCEP message. In other words, LER 4A may process advertisement 10 and the PCEP message to map traffic flows to tagged LSPs (160). As shown in FIG. 2, LER 4A may include a control unit 71 comprising both a control plane 72A and a data plane 72B. LER 4A may execute a BGP instance 88A in control plane 72A, which upon receiving advertisement 10, may process advertisement 10 and update RIB 86 and/or TED 84 to include the association between the network flows and the LSP tag. LER 4A may also execute an instance of PCEP (i.e., in support of PCE interface 94 in this example) that processes the communication and updates TED 84 to include the association between the LSP tag and LSPs 14A and 14C.

Control plane 72A, when executing BGP 88A, may resolve updated RIB 86 in view of the link state database to generate forwarding information 98 that provides for a chain of next hops with corresponding actions and includes the mapping criteria (or flow specifications) for admitting the packets to LSPs 14A and 14C, while also defining how the mapping of packets to multiple LSPs 14A and 14C is to be handled (162). Control plane 72A of LER 4A may then install forwarding information 98 in the forwarding plane (replacing or augmenting existing forwarding information 98) (164). Forwarding unit 96 of LER 4A may then begin processing network traffic corresponding to the network flows to forward the packets via one of LSPs 14A and 14C identified by the label switched path tag (166).

In other words, in environments where a central controller creates LSPs dynamically, it may be beneficial to also centrally control what traffic will be mapped to these LSPs. This work is directly related to the stateful PCE enhancements, where it may be beneficial to control, not just how tunnels are routed or when they are created, but also how traffic is mapped onto them. While a solution to this problem may be developed that purely center around PCEP, the disadvantage may be that this approach does not have a good migration path and does not work well in environments where only some of the LSPs are centrally controlled. The techniques described in this disclosure may provide, at least in part, rapid service enablement, given that the techniques may provide the ability to quickly define traffic mapping (often without creating configuration events) and may work for both PCE-controlled and non-PCE-controlled LSPs. These techniques may provide a dynamic way of distributing traffic mapping in a domain.

The techniques may meet the following goals. First, the techniques may provide the ability to map traffic to one or several specific LSPs, based on various criteria. One criterion can be a 5-tuple match (identifying a FEC). For example: map traffic from a gaming application (identified by a specific port number) to low-latency LSPs, or map traffic destined for a specific destination to LSPs going to that destination. Another criterion may be to direct traffic to an LSP based on particular behavior observed for the traffic. Another criterion may be to direct traffic to an LSP based on services (as identified by VPN/routing instance). Second, the techniques may enable a mapping that is many-to-many, meaning that several FECs may be mapped to a single LSP, a single FEC may map to one or more LSPs (up to the limit imposed by equal cost multi-path or weighted equal cost multi-path), and/or several FECs may map to a set of LSPs. Third, the techniques may support distributing uniform mapping information throughout the network, e.g., for enabling/disabling/upgrading/downgrading a service, without having to configure all the edge nodes (i.e., LERs in this example).

The techniques may therefore enable PCE 6 to split the LSP identification from the mapping function in the manner described above. In accordance with the techniques described in this disclosure, PCE 6 may identify LSPs with opaque 6-byte identifiers (such as the extended communities described above). How these identifiers are structured may be a local matter to the deployment. For example, in one deployment the identifier (i.e., the LSP tag in this example) may have the tunnel destination address embedded, while in another deployment, the identifier may have the PCE's id embedded in it. The techniques may rely, as described above, on the BGP flow specification machinery to distribute the mapping information. New match functions may then be defined for matching on virtual routing functions (VFRs) using one/more routing table, and a new action is defined to match to the LSP identified with the 6-byte community-like identifier.

The following provides more specific information as to how the BGP flow specification is extended to accommodate the new communities for defining and processing these messages to enable mapping traffic to label switched paths. An active stateful Path Computation Element can dynamically instantiate LSPs using the procedures defined in Crabbe, E., Minei, I., Sivabalan, S., and R. Varga, "PCEP Extensions for PCE-initiated LSP Setup in a Stateful PCE Model", draft-ietf-pce-pce-initiated-lsp-00, October 2013, the entire contents of which are hereby incorporated by reference as if set forth in its entirety. The LSPs may be tagged with an LSP-tag similar to an extended community, using the procedures defined below in more detail. This document proposes an extension to the procedures of the above noted RFC 5575 that enables mapping of traffic onto one or more LSPs identified with such LSP-tags. Although the description above is in the context of a stateful PCE, the extensions are equally applicable to a fully distributed environment as well.

The Internet Draft by Crabbe, E., Medved, J., Minei, I., and R. Varga, "PCEP Extensions for Stateful PCE", draft-ietf-pce-stateful-pce-07 (work in progress), dated October 2013, which is hereby incorporated by reference as if set forth in its entirety herein, specifies the PCEP extensions in support of active stateful PCEs. A PCC can delegate its LSPs to the PCE, potentially allowing the PCE to update various attributes (such as path or bandwidth) The foregoing Internet Draft entitled "PCEP Extensions for PCE-initiated LSP Setup in a Stateful PCE Model" specifies a mechanism allowing a PCE to dynamically instantiate LSPs on a PCC by sending the path and characteristics of the LSP. In both cases, the PCE takes an active role, initiating changes in the network without the PCC initiating this interaction. This model may make an active stateful PCE a very attractive building block for SDN solutions.

When integrating a stateful PCE in a larger solution, the mapping of traffic to the LSPs may represent an important function. Two decisions may be taken to allow for such a mapping: 1) which traffic should be mapped (forwarding equivalence class identification), for example "map all traffic with destination port xxx" and 2) which is the LSP onto which the traffic should be forwarded (LSP identification), for example "LSP to destination yyy, with latency guarantee x". In some example, a) multiple forwarding equivalence classes (FECs) may be mapped to the same LSP, b) one FEC may be mapped to one or more LSPs and c) the mapping should be communicated in a way that allows both PCE-controlled and non-PCE-controlled LSPs to be used, and allows both a central and a distributed mode of operation, so as to allow deployment of this function in a mixed network.

Similar to how a route may be associated with one or more communities in BGP, an LSP may be tagged with one or more opaque LSP-tags to allow for easy LSP identification. More information regarding this tagging is provided below, but briefly this tagging aspect of the techniques may specify how such an association may be achieved using extensions to PCEP.

This disclosure defines how, in some examples, traffic can be mapped to LSPs tagged with LSP-tags using the mechanisms defined in RFC 5575 and minor extensions. In operation, the application of traffic filtering using flow specifications is described in RFC 5575 and summarized here for purposes of convenience. Flow specifications are encoded in the variable-length flow specification NLRI described in section 4 of RFC 5575. The flow specification can describe various flows, by matching on various fields in the packet header (for example source and destination address or port). This specification can easily express 5-tuple matches for incoming traffic, such as "match all packets to 10.0.1/24 and TCP port 25". Currently undefined is, for example, the ability to also match on service-specific information, e.g., traffic belonging to a particular virtual private network (VPN). This encoding may require the definition of additional subcomponent types. Along with the flow specification advertisement, a traffic filtering action may be communicated by associating an extended community of a well-known type. Several such community types are defined in RFC 5575, and encode actions such as rate-limiting, remarking or redirecting traffic, while the actual value encodes relevant information for performing the action.

In the context of mapping traffic to LSPs, two new extended community types encode the action of redirecting traffic onto the set of LSPs (either equally or according to the relative bandwidths of the LSPs). The value of the community encodes the LSP-tag to be used for finding this set.

In terms of the flow specification and how it is extended, the flow specification may remain mostly unchanged from RFC 5575. Extensions for match conditions including service-specific information are possible.

With regard to the traffic filtering actions, the techniques may provide for the extensions set forth in the following table to BGP flow specification:

| type   | extended community | encoding             |
|--------|--------------------|----------------------|
| 0x800b | redirect-ECMP      | opaque 6-byte LSP-TAG |
| 0x800c | redirect-WECMP     | opaque 6-byte LSP-TAG |

The redirect-ECMP community may load balance the traffic equally over all LSPs that are tagged with the LSP-tag matching its value. If the number of LSPs exceeds the router's capacity of ECMP, the process for selecting those LSPs that are to be used for forwarding may be determined locally. The redirect-WECMP community load balances the traffic proportionately with the sizes of the LSPs tagged with an LSP-tag matching its value. If the number of LSPs exceeds the router's capacity of ECMP, the process for selecting those LSPs that are to be used for forwarding may be determined locally. If the router does not support load balancing proportionately with the sizes of the LSPs, an error is thrown.

The following provides more detail regarding the LSP tagging aspect of the techniques described in this disclosure, clarifying how to enable a stateful PCE to tag label switched paths. As noted above, an active stateful PCE may change characteristics of label switched paths (LSPs), or even initiate the creation of LSPs. How these LSPs are used for forwarding traffic has been considered a topic outside of PCEP's scope. Regardless of how such a mapping is implemented, it generally requires the ability to identify the LSP or LSPs to use for forwarding in a flexible way. This document proposes an extension to PCEP to allow tagging LSPs for the purpose of traffic mapping.

The extensions to PCEP described above support active stateful PCEs. A PCC can delegate its LSPs to the PCE, allowing the PCE to update various attributes (such as path or bandwidth) These PCE extensions provide a mechanism that allows a PCE to dynamically instantiate LSPs on a PCC by sending the path and characteristics of the LSP. In both cases, the PCE takes an active role, initiating changes in the network without the PCC initiating this interaction. This model may provide an active stateful PCE a very attractive building block for SDN solutions.

When integrating a stateful PCE in a larger solution, the mapping of traffic to the LSPs may be considered an important function. Two decisions may be taken to allow for such a mapping: 1) which traffic should be mapped (forwarding equivalence class identification), for example "map all traffic with destination port xxx" and 2) which is the LSP onto which the traffic should be forwarded (LSP identification), for example "LSP to destination yyy, with latency guarantee x". In some instances, a) multiple forwarding equivalence classes (FECs) may be mapped to the same LSP, b) one FEC may be mapped to one or more LSPs and c) the mapping may be communicated in a way that allows both PCE-controlled and non-PCE-controlled LSPs to be used, and allows both a central and a distributed mode of operation, so as to allow deployment of this function in a mixed network.

Similar to how a route may be associated with one or more communities in BGP, an LSP may be tagged with one or more opaque LSP-tags to allow for easy LSP identification. This association may be 1) configured on the router or 2) communicated by an active stateful PCE or 3) distributed in a dynamic way (outside the scope of this disclosure). This disclosure may define the procedures for associating an LSP-tag to an LSP using PCEP.

With regard to the label switched path tag, a new TLV may be defined in PCEP. The LSP TAG represents an opaque value to be associated with an LSP. The same LSP TAG may be associated with several LSPs by sending the LSP-TAG in a PCUpd message for each of them. One LSP may be associated with multiple LSP TAGs by specifying them in separate TLVs. The operator may define the opaque tag in any way that is convenient operationally. For example, the operator may choose to embed the LSP destination address in the LSP TAG. The tags associated with an LSP may change during the lifetime of the LSP (for example, if a tag represents compliance to a latency bound, when the LSP is rerouted along a non-compliant path, the tag would need to be removed to avoid mapping delay-sensitive traffic to it).

The following provides one example of the LSP tag TLV:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Type [TBD]           |          Length = 8           |
+-+-+-+-+-+-+-+-+-+-+-+-+-+-+-+-+-+-+-+-+-+-+-+-+-+-+-+-+-+-+-+-+
|     Flags     |D|  Reserved   |             Tag               |
+-+-+-+-+-+-+-+-+-+-+-+-+-+-+-+-+                               +
|                                                               |
+-+-+-+-+-+-+-+-+-+-+-+-+-+-+-+-+-+-+-+-+-+-+-+-+-+-+-+-+-+-+-+-+
```

The LSP-TAG TLV may represent an optional TLV for use in the LSP Object. The TLV format is shown above, where the type of the TLV is to be defined identifies this as the LSP tag, and the flags field defines a single flag, the dis-association flag. When D=1, the flag indicates that he tag specified in the TLV is to be dissociated from the LSP specified in the LSP object. On PCUpd, the D flag may be set by the PCE to request a dis-association of a tag it previously set. In a PCRpt message, the PCC may report all the tags associated with an LSP. If a tag is missing it is considered removed (this is to support reporting associations communicated via different mechanisms, for example configuration, as well as associations established by the PCE), an error condition may occur. When not supported, can either do capability negotiation or just ignore the unknown TLV.

Figure 7:
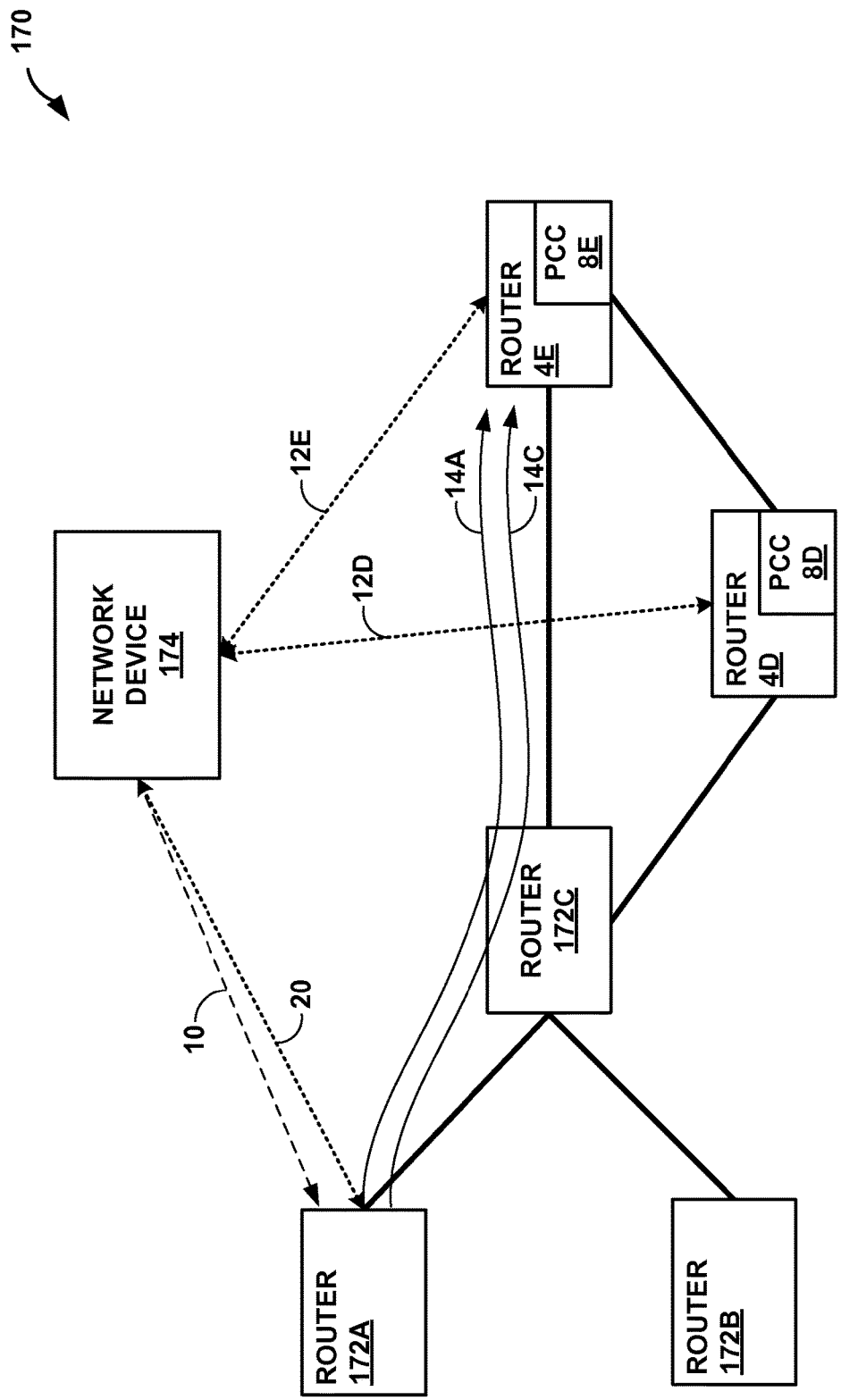
FIG. 7 is a block diagram illustrating a network system in which a network device is configured to perform various aspects of the traffic mapping techniques set forth in this disclosure.

FIG. 7 is a block diagram illustrating another example network system 170 that may perform various aspects of the traffic mapping techniques described in this disclosure. Network system 170 may be similar to network system 2 of FIG. 1, except that network system 170 may only be partially centrally managed, where routers 4A-4C of FIG. 1 are replaced with routers 172A-172C that do not implement or otherwise operate in accordance with PCEP or provide PCCs. Moreover, PCE 6 of network system 2 is replaced in network system 170 by a network device 174, which may represent a route reflector, label edge router, network management system or any other type of network device capable of performing various aspects of the techniques described in this disclosure. Network device 174 may generate, similar to PCE 6, advertisement 10 and send this advertisement 10 to router 172A. Network device 174 may also generate communication 20 and send this communication to router 172A, however, communication 20 may not conform to PCEP given the lack of PCEP functionality within router 172A. In this respect, the techniques may be implemented in non-PCEP functional networks or partially-PCEP functional networks and should not be limited to PCEP functional portions of a network.

In this way, the techniques may enable a network device, such as PCE 6 shown in the example of FIG. 1 or network device 18 shown in the example of FIG. 2, generate an advertisement that conforms to a routing protocol used for advertising routing information, the advertisement advertising a mapping between a network flow and a label switched path tag. This network device may also generate a communication associating the label switched path tag with a label switched path. The network device may then transmit the advertisement in accordance with the routing protocol to a head-end label edge router that admits traffic into the label switched path identified by the label switch path tag, and transmit the communication to the label edge router such that the label edge router is able to process the communication in conjunction with the advertisement to map the network flow to the label switched path identified by the label switched path tag.

From the perspective of a network device that receives these communications, the techniques may enable a label edge router, such as LER 4A shown in the example of FIG. 1, to receive an advertisement 10 from a network device, e.g., PCE 6 or network device 18, the advertisement conforming to a routing protocol and advertising a mapping between a network flow and a label switched path tag. This LER may also receive a communication associating the label switched path tag with the label switched path. The LER may then process the communication and the advertisement to map the network flow to the label switched path identified by the label switched path tag and process network traffic corresponding to the network flow to forward the packets via the label switched path identified by the label switched path tag.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable medium may cause a programmable processor, or other processor, to perform the method, e.g., when the instructions are executed. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of the techniques have been described. These and other aspects are within the scope of the following claims.

What is claimed is:

1. A method comprising:
   executing, by a network device, a multiprotocol label switching protocol to direct a plurality of routers along a path to establish a label switched path along the path, the plurality of routers including a head-end label edge router that acts as an ingress to admit traffic into the label switched path and a tail-end label edge router that acts as an egress from the label switched path;
   executing, by the network device, a path computation element communication protocol to generate a communication associating a label switched path community with the established label switched path;
   transmitting, by the network device, in accordance with the path computation element communication protocol, and after the label switched path has been established to use one or more labels when admitting traffic into the label switched path, the communication to the head-end label edge router;
   identifying, by the network device and based on traffic mapping rules, a mapping between a layer three network flow and the label switched path community;
   executing, by the network device, a routing protocol used for routing advertising information to generate an advertisement advertising the mapping; and
   transmitting, by the network device and in accordance with the routing protocol, the advertisement to the head-end label edge router so that the head-end label edge router is able to map the layer three network flow to the label switched path identified by the label switched path community and admit traffic corresponding to the layer three network flow into the label switched path identified by the label switched path community, and the layer three network flow identified in the advertisement by one or more of a destination address, a destination port, a source address, a source port, and a protocol.

2. The method of claim 1, wherein transmitting the advertisement comprises transmitting, in accordance with a border gateway protocol, a routing advertisement to the head-end label edge router.

3. The method of claim 1, wherein transmitting the advertisement comprises transmitting, in accordance with a border gateway protocol network layer reachability information encoding format for distribution of flow specifications to the head-end label edge router, a routing advertisement defining the mapping between the layer three network flow and the label switched path community as a border gateway protocol community.

4. The method of claim 1,
   wherein transmitting the communication comprises transmitting a first communication associating the label switched path community with a first label switched path,
   wherein the method further comprises transmitting a second communication associating the label switched path community with a second label switched path, and
   wherein transmitting the advertisement comprises transmitting, in accordance with a border gateway protocol network layer reachability information encoding format for distribution of flow specifications, a routing advertisement defining the mapping between the layer three network flow and the label switched path community as a border gateway protocol community and also indicating that equal cost multi-path routing is to be performed by the label edge router when admitting traffic associated with the layer three network flow to the first label switched path and the second label switched path.

5. The method of claim 1,
wherein transmitting the communication comprises transmitting a first communication associating the label switched path community with a first label switched path,
wherein the method further comprises transmitting a second communication associating the label switched path community with a second label switched path, and
wherein transmitting the advertisement comprises transmitting, in accordance with a border gateway protocol network layer reachability information encoding format for distribution of flow specifications, a routing advertisement defining the mapping between the layer three network flow and the label switched path community as a border gateway protocol community and also indicating that weighted equal cost multi-path routing is to be performed by the label edge router when admitting traffic associated with the layer three network flow to the first label switched path and the second label switched path.

6. The method of claim 1, wherein the network device comprises a path computation element that performs path computation for the label edge router to configure the label switched path in response to a path computation request issued by the head-end label edge router.

7. The method of claim 1, wherein the network device does not perform path computation on behalf of the head-end label edge router to facilitate configuration of the label switched path.

8. A network device comprising:
one or more processors configured to:
execute a multiprotocol label switching protocol to direct a plurality of routers along a path to establish a label switched path along the path, the plurality of routers including a head-end label edge router that acts as an ingress to admit traffic into the label switched path and a tail-end label edge router that acts as an egress from the label switched path;
execute a path computation element communication protocol, to generate, a communication associating a label switched path community with the established label switched path;
identify, based on traffic mapping rules, a mapping between a layer three network flow and the label switched path community; and
execute a routing protocol used for routing advertising information to generate an advertisement advertising the mapping; and
an interface card configured to:
transmit, in accordance with the path computation element communication protocol and after the label switched path has been established to use one or more labels when admitting traffic into the label switched path, the communication to the head-end label edge router; and
transmit, in accordance with the routing protocol used for advertising routing information and after the label switched path has been established to use one or more labels when admitting traffic into the label switched path, the advertisement to the head-end label edge router so that the head-end label edge router is able to map the layer three network flow to the label switched path identified by the label switched path community and admit traffic corresponding to the layer three network flow into the label switched path identified by the label switched path community, and the layer three network flow identified in the advertisement by one or more of a destination address, a destination port, a source address, a source port, and a protocol.

9. The network device of claim 8, wherein the advertisement comprising a routing advertisement that conforms to a border gateway protocol.

10. The network device of claim 8, wherein the advertisement comprising a routing advertisement that conforms to a border gateway protocol network layer reachability information encoding format for distribution of flow specifications, and defines the mapping between the layer three network flow and the label switched path community as a border gateway protocol community.

11. The network device of claim 8,
wherein the communication comprises a first communication associating the label switched path community with a first label switched path,
wherein the network interface is further configured to generate a second communication associating the label switched path community with a second label switched path, and
wherein the network interface is configured to transmit a routing advertisement that conforms to a border gateway protocol network layer reachability information encoding format for distribution of flow specifications, the routing advertisement defining the mapping between the layer three network flow and the label switched path community as a border gateway protocol community and also indicating that equal cost multi-path routing is to be performed by the label edge router when admitting traffic associated with the layer three network flow to the first label switched path and the second label switched path.

12. The network device of claim 8,
wherein the network interface is configured to generate a first communication associating the label switched path community with a first label switched path,
wherein the network interface is further configured to generate a second communication associating the label switched path community with a second label switched path, and
wherein the network interface is configured to transmit a routing advertisement that conforms to a border gateway protocol network layer reachability information encoding format for distribution of flow specifications, the routing advertisement defining the mapping between the layer three network flow and the label switched path community as a border gateway protocol community and also indicating that weighted equal cost multi-path routing is to be performed by the label edge router when admitting traffic associated with the layer three network flow to the first label switched path and the second label switched path.

13. A method comprising:
receiving, with a head-end label edge router that acts as in ingress to admit network traffic to a label switched path that has been established from the head-end label edge router to a tail-end label edge router in accordance with a multi-protocol label switching protocol to use one or more labels to transmit traffic along the label switched path and in accordance with a path computation element communication protocol, a communication associating a label switched path community with the established label switched path;

receiving, with the head-end label edge router and in accordance with a routing protocol used for advertising routing information, a routing advertisement advertising a mapping between a layer three network flow and the label switched path community, the layer three network flow identified in the routing advertisement by one or more of a destination address, a destination port, a source address, a source port, and a protocol;

processing, with the head-end label edge router, the communication and the routing advertisement to map the layer three network flow to the label switched path identified by the label switched path community; and processing, with the head-end label edge router, network traffic corresponding to the layer three network flow to admit the network traffic corresponding to the layer three network flow into the label switched path identified by the label switched path community.

14. The method of claim 13, wherein the routing protocol comprises a border gateway protocol.

15. The method of claim 13, wherein the routing advertisement conforms to a border gateway protocol network layer reachability information encoding format for distribution of flow specifications and defines the mapping between the layer three network flow and the label switched path community as a border gateway protocol community.

16. The method of claim 13,
wherein the label switched path comprises a first label switched path,
wherein the head-end label edge router is the head-end label edge router for a second label switched path;
wherein the communication comprises a first communication associating the label switched path community with the first label switched path,
wherein the method further comprises receiving a second communication associating the label switched path community with the second label switched path,
wherein the routing advertisement conforms to a border gateway protocol network layer reachability information encoding format for distribution of flow specifications and defines the mapping between the layer three network flow and the label switched path community as a border gateway protocol community and also indicates that equal cost multi-path routing is to be performed when admitting traffic associated with the layer three network flow to the first label switched path and the second label switched path, and
wherein processing the network traffic comprises processing the network traffic corresponding to the layer three network flow to admit the network traffic corresponding to the layer three network flow into the first label switched path and the second label switched path in accordance with equal cost multi-path routing.

17. The method of claim 13,
wherein the label switched path comprises a first label switched path,
wherein the head-end label edge router is the head-end label edge router for a second label switched path;
wherein the communication comprises a first communication associating the label switched path community with the first label switched path,
wherein the method further comprises receiving a second communication associating the label switched path community with the second label switched path,
wherein the routing advertisement conforms to a border gateway protocol network layer reachability information encoding format for distribution of flow specifications and defines the mapping between the layer three network flow and the label switched path community as a border gateway protocol community and also indicates that weighted equal cost multi-path routing is to be performed when admitting traffic associated with the layer three network flow to the first label switched path and the second label switched path, and
wherein processing the network traffic comprises processing the network traffic corresponding to the layer three network flow to admit the network traffic corresponding to the layer three network flow into the first label switched path and the second label switched path in accordance with weighted equal cost multi-path routing.

18. The method of claim 13,
wherein the network device comprises a path computation element,
wherein the method further comprises:
generating and transmitting a path computation request to the path computation element, the path computation request requesting that the path computation element select the label switched path;
receiving a path computation response from the path computation element providing information to configure the label switched path; and
configuring, with the label edge router and prior to receiving the communication, the label switched path based on the information provided by the path computation response.

19. The method of claim 13, wherein the network device does not perform path computation on behalf of the label edge router to facilitate configuration of the label switched path.

20. A head-end label edge router configured to admit network traffic to a label switched path, the label edge router comprising:
an interface card configured to receive, after the label switched path has been established from the head-end label edge router to a tail-end label edge router in accordance with a multi-protocol label switching protocol to use one or more labels to admit traffic into the label switched path and in accordance with a path computation element communication protocol, a communication associating a label switched path community with the label switched path, and receive, in accordance with a routing protocol used for advertising routing information, a routing advertisement advertising a mapping between a layer three network flow and the label switched path community, the layer three network flow identified in the routing advertisement by one or more of a destination address, a destination port, a source address, a source port, and a protocol; and
a control unit configured to process the communication and the advertisement to map the layer three network flow to the label switched path identified by the label switched path community, and process network traffic corresponding to the layer three network flow to admit the network traffic corresponding to the layer three network flow into the label switched path identified by the label switched path community.

21. The label edge router of claim 20, wherein the routing protocol comprises a border gateway protocol.

22. The label edge router of claim 20, wherein the routing advertisement conforms to a border gateway protocol network layer reachability information encoding format for distribution of flow specifications and defines the mapping between the layer three network flow and the label switched path community as a border gateway protocol community.

23. The label edge router of claim 20,
wherein the label switched path comprises a first label switched path,
wherein the label edge router is the head-end label edge router for a second label switched path;
wherein the communication comprises a first communication associating the label switched path community with the first label switched path,
wherein the interface card further receives a second communication associating the label switched path community with the second label switched path,
wherein the routing advertisement conforms to a border gateway protocol network layer reachability information encoding format for distribution of flow specifications and defines the mapping between the layer three network flow and the label switched path community as a border gateway protocol community and also indicates that equal cost multi-path routing is to be performed when admitting traffic associated with the layer three network flow to the first label switched path and the second label switched path, and
wherein the control unit is further configured to, when processing the network traffic, processes the network traffic corresponding to the layer three network flow to admit the network traffic corresponding to the layer three network flow into the first label switched path and the second label switched path in accordance with equal cost multi-path routing.

24. The label edge router of claim 20,
wherein the label switched path comprises a first label switched path,
wherein the label edge router is the head-end label edge router for a second label switched path;
wherein the communication comprises a first communication associating the label switched path community with the first label switched path,
wherein the interface card further receives a second communication associating the label switched path community with the second label switched path,
wherein the routing advertisement conforms to a border gateway protocol network layer reachability information encoding format for distribution of flow specifications and defines the mapping between the layer three network flow and the label switched path community as a border gateway protocol community and also indicates that weighted equal cost multi-path routing is to be performed when admitting traffic associated with the layer three network flow to the first label switched path and the second label switched path, and
wherein the control unit is further configured to, when processing the network traffic, process the network traffic corresponding to the layer three network flow to admit the network traffic corresponding to the layer three network flow into the first label switched path and the second label switched path in accordance with weighted equal cost multi-path routing.

* * * * *